(12) United States Patent
Sethi et al.

(10) Patent No.: US 11,159,348 B2
(45) Date of Patent: Oct. 26, 2021

(54) HIGH EFFICIENCY LONG TRAINING FIELD SYMBOL TRANSMISSION FOR MULTIPLE TRANSMISSION STREAMS

(71) Applicant: Marvell World Trade Ltd., St. Michael (BB)

(72) Inventors: Ankit Sethi, Pune (IN); Sayak Roy, Kolkata (IN); Hari Ram Balakrishnan, Chennai (IN); Sudhir Srinivasa, Los Gatos, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 119 days.

(21) Appl. No.: 16/574,942

(22) Filed: Sep. 18, 2019

(65) Prior Publication Data

US 2020/0092142 A1    Mar. 19, 2020

Related U.S. Application Data

(60) Provisional application No. 62/732,893, filed on Sep. 18, 2018.

(51) Int. Cl.
*H04L 25/02* (2006.01)
*H04L 25/14* (2006.01)
*H04B 7/0452* (2017.01)
*H04L 27/26* (2006.01)
*H04W 72/04* (2009.01)

(52) U.S. Cl.
CPC ....... *H04L 25/0226* (2013.01); *H04B 7/0452* (2013.01); *H04L 25/0236* (2013.01); *H04L 25/14* (2013.01); *H04L 27/2613* (2013.01); *H04W 72/042* (2013.01)

(58) Field of Classification Search
CPC combination set(s) only.
See application file for complete search history.

(56) References Cited

U.S. PATENT DOCUMENTS

| | | | |
|---|---|---|---|
| 10,320,601 B2* | 6/2019 | Lee | H04L 29/08 |
| 2011/0142020 A1 | 6/2011 | Kang et al. | |
| 2016/0165482 A1* | 6/2016 | Yang | H04L 5/0007 370/336 |
| 2016/0380729 A1* | 12/2016 | Porat | H04B 7/0617 370/329 |
| 2016/0380794 A1* | 12/2016 | Sun | H04L 27/2613 370/328 |
| 2017/0170885 A1* | 6/2017 | Li | H04B 7/0413 |
| 2017/0373808 A1 | 12/2017 | Park et al. | |
| 2018/0184408 A1* | 6/2018 | Xue | H04W 72/044 |

\* cited by examiner

*Primary Examiner* — Xavier S Wong

(57) ABSTRACT

Embodiments described herein provide a system for transmitting high efficiency long term training field (HE-LTF) symbols for multiple wireless spatial streams over a wireless channel. An advanced P-matrix design is used to construct HE-LTF symbols that are processed by a receiver such that channel properties such as channel estimates or carrier phase error are determined prior to receiving all HE-LTF symbols. Tone multiplexing of wireless spatial stream is also used to transmit multiple spatial streams based on an assignment of sets of spatial streams to sets of tones available for transmission, increasing the throughput of the transmission system. The advanced P-matrix design and tone multiplexing are used in combination to achieve calculate channel properties before receiving all HE-LTF symbols while minimizing power fluctuation among the high efficiency short training field symbol and the HE-LTF symbols.

20 Claims, 7 Drawing Sheets

HIGH EFFICIENCY LONG TRAINING FIELD SYMBOL TRANSMISSION FOR MULTIPLE TRANSMISSION STREAMS

CROSS-REFERENCE TO RELATED APPLICATION

This application claims the benefit under 35 U.S.C. § 119(e) of U.S. Provisional Patent Application No. 62/732,893, filed Sep. 18, 2018, which is hereby incorporated by reference herein in its entirety.

FIELD OF USE

This disclosure relates to high efficiency long training field (HE-LTF) symbols in wireless communication systems, and specifically, HE-LTF symbol generation for multiple transmission streams.

BACKGROUND OF THE DISCLOSURE

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

Various techniques such as massive multiple input multiple output (MIMO) or millimeter wave have been proposed to address an increasing demand for increased data throughput and higher speeds in wireless communications systems. Moreover, access points compliant with emerging wireless communications standards, such as IEEE 802.11ax, will also need to initiate an increased number of transmission spatial streams in order to serve increased numbers of user devices.

With increasing number of transmission streams, the computation required to estimate the wireless channel over these transmission streams becomes increasingly complex using current standards for channel estimation. For example, the increasing size of mapping matrices for high efficiency long training field (HE-LTF) symbol generation with increasing transmission streams necessitates systems and methods to reduce inherent computational complexity and power demands of emerging standards.

SUMMARY

Embodiments described herein provide a system for transmitting High Efficiency Long Training Field (HE-LTF) symbols to a receiver over a wireless channel. A transmitter is configured to transmit HE-LTF symbols corresponding to an LTF mapping matrix for determining a plurality of wireless channel properties of the wireless channel over which the HE-LTF symbols are transmitted by the transmitter. Control circuitry, coupled to the transmitter, is configured to determine a portion of the LTF mapping matrix for calculating, at a receiver, a wireless channel property of the plurality of wireless channel properties based on a subset of the HE-LTF symbols mapped by the portion. The portion is less than the entire LTF mapping matrix, in some implementations. The control circuitry is further configured to assemble, based at least on the determined portion of the LTF mapping matrix, the HE-LTF symbols mapped by the LTF mapping matrix.

The control circuitry is, in some implementations, configured to determine the portion of the LTF mapping matrix by concatenating a portion of a fixed matrix with a zero matrix. A position of the portion of the fixed matrix in the portion of the LTF mapping matrix corresponds to the spatial stream and the fixed matrix associated with a standard LTF mapping matrix. In some embodiments, the LTF mapping matrix is an R-matrix representative of a training matrix for determining carrier phase error accumulated over the transmitted HE-LTF symbols, and the transmitter is further configured to transmit HE-LTF symbols mapped by the R-matrix over one or more pilot tones in the wireless channel. For HE-LTF symbols mapped by the R-matrix transmitted over the pilot tone, the control circuitry is configured to assemble the HE-LTF symbols mapped by the R-matrix by aligning the portion of the fixed matrix within a subset of rows of the R-matrix for application, at the receiver, of an inverse of the fixed matrix and a pseudo inverse of a channel response matrix to the R-matrix to obtain carrier phase error associated with the spatial stream.

In some implementations, the LTF mapping matrix is a P-matrix representative of a training matrix for determining at least a channel estimate of the spatial stream. The transmitter is further configured to transmit HE-LTF symbols mapped by the P-matrix over one or more data tones in the wireless channel. For HE-LTF symbols mapped by the P-matrix transmitted over the data tone, the control circuitry is configured to assemble the HE-LTF symbols mapped by the P-matrix by interleaving the portion of the fixed matrix diagonally for application, at the receiver, of an inverse of the fixed matrix at the position of the portion of the fixed matrix in the P-matrix to determine the channel estimate of the spatial stream after receiving a subset of the transmitted HE-LTF symbols.

The HE-LTF symbols are transmitted, in some implementations, over a plurality of wireless spatial streams and the control circuitry is further configured to assign a subset of the wireless spatial streams to a set of tones in the wireless channel. In some embodiments, the control circuitry is further configured to cyclically shift the rows of the LTF mapping matrix a predetermined number of times such that each tone of the set of tones is associated with a cyclically shifted LTF mapping matrix by shifting the rows of a predetermined LTF mapping matrix cyclically by a number corresponding to a modulo of a tone number over which the shifted LTF mapping matrix is transmitted.

Embodiments described herein further provide a system for channel estimation based on High Efficiency Long Training Field (HE-LTF) symbols transmitted to a receiver over a wireless channel by a transmitter over a plurality of tones. Control circuitry, coupled to the transmitter, is configured to assign, based on a modulo operation applied to tone indices corresponding to the plurality of tones, a plurality of wireless spatial streams to the plurality of tones. In some embodiments, a subset of the plurality of tones is separated by one or more tones unassigned to the subset of the plurality of tones. The control circuitry is further configured to generate, based on the assigned plurality of wireless spatial streams, the HE-LTF symbols for estimating, at the receiver, the wireless channel having bandwidth coherency within the plurality of tones. The transmitter configured to transmit, over the plurality of tones, the generated HE-LTF symbols for interpolation of a channel estimate matrix corresponding to the one or more tones unassigned to the subset of the unassigned tones.

The control circuitry is further configured to, in some implementations, select an HE mode associated with a maximum number of tones available for transmission of the HE-LTF symbols, wherein the number of the plurality of tones is the maximum number of tones. The control circuitry is configured to select the HE mode by selecting a 4×HE-LTF mode having the maximum number of tones available for transmission of the HE-LTF symbols, in some embodiments. The control circuitry is configured to, in some implementations, select the HE mode by selecting a 2×HE-LTF mode having half of the maximum number of tones available for transmission of the HE-LTF symbols. The control circuitry is further configured to, in some embodiments, select a tone-select mode indicative of a maximum number of subsets of wireless spatial streams transmittable over the plurality of tones. The control circuitry is further configured to, in some implementations, select a first tone-select mode and in response to selecting the first tone-select mode, divide the maximum number of tones into four subsets of tones available for transmission of the HE-LTF symbols.

In some implementations, the control circuitry is further configured to determine, based on the tone-select mode, a minimum number of the number of wireless spatial streams assignable to each subset of the four subsets of the plurality of tones and distribute a remaining number i of wireless spatial streams, calculated based on the minimum number, evenly among i subsets of the four subsets. In some embodiments, the control circuitry is configured to generate a P-matrix having a first amount of rows of a pre-defined matrix, wherein the first amount corresponds to the number of the subset of wireless spatial streams to be transmitted over the subset of the plurality of tones.

The transmitter is further configured to, in some implementations, transmit a spatial mapping matrix associated with a mapping of a channel response matrix to the plurality of wireless spatial streams over the plurality of tones, the spatial mapping matrix having a number of rows associated with a number of antennas at the transmitter and a number of columns associated with a number of the plurality of wireless spatial streams. The control circuitry is further configured to, in some embodiments, generate the spatial mapping matrix based on a portion of the spatial mapping matrix, wherein the portion has the number of rows associated with the number of antennas at the transmitter and a number of columns corresponding to the number of the subset of wireless spatial streams to be transmitted over the subset of the plurality of tones. The control circuitry is further configured to, for a plurality of users, transmit HE-LTF symbols associated with a first user of the plurality of users on a first tone and transmit HE-LTF symbols associated with a second user of the plurality of users on a second tone, in some implementations.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

Figure 1:
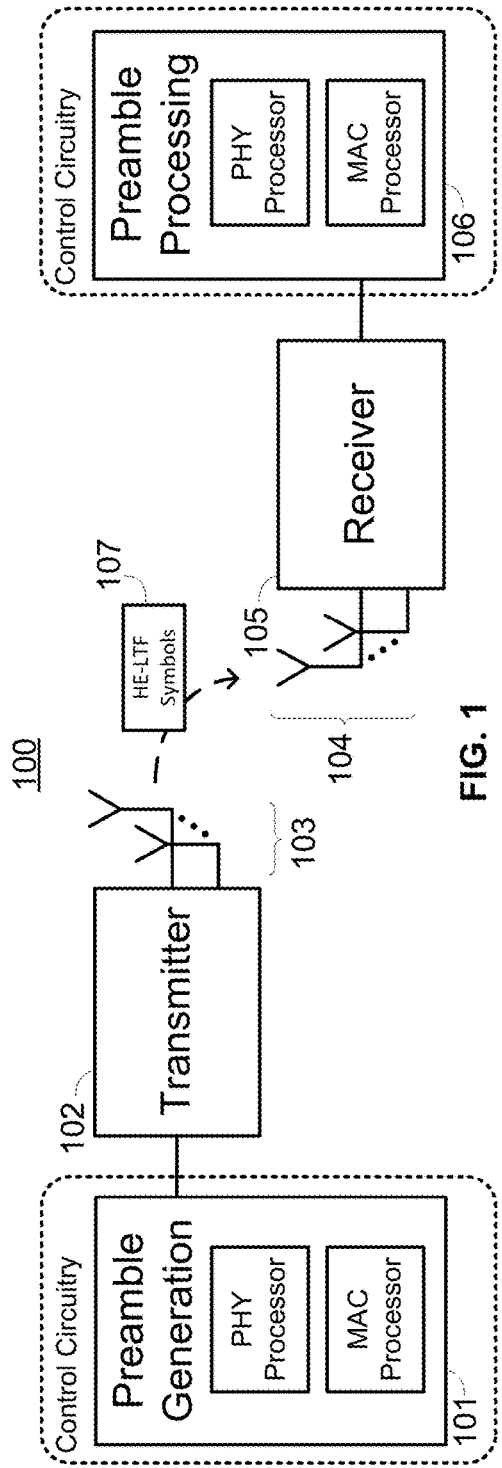
FIG. 1 is a block diagram of an illustrative wireless communications system for transmitting high efficiency long training field (HE-LTF) symbols in accordance with at least some embodiments of the present disclosure.

This disclosure describes methods and systems for transmitting high efficiency long training field (HE-LTF) symbols for multiple transmission streams. Specifically, various methods for accommodating increasing numbers of transmitted spatial streams based on an advanced P-matrix design, tone multiplexing for spatial streams, and a combination thereof are described herein.

With techniques such as massive multiple input multiple output (MIMO) or millimeter wave being proposed to address the increasing demand for more data at higher speeds, in comparison to systems implemented under the soon to be completed IEEE 802.11ax standard, an access point (AP) in a wireless communications system compliant with emerging will need to initiate a larger number of transmission streams in order to serve many more user devices. With increasing number of transmission streams, the size of the P-matrix—a training matrix for channel estimation that is defined for various matrix sizes in the IEEE 802.11ax standard, used in high efficiency long training field (HE-LTF) symbol generation—will also increase.

The access point generates a wireless packet for transmission that includes a preamble, data, midable, postamble, any suitable data sequence for transmission within the packet, or any combination thereof. In some embodiments, a packet is arranged sequentially for transmission such that the preamble is transmitted first, followed by the data payload, and finally the postamble. In some embodiments, the preamble includes multiple training field symbols including the HE-LTF symbols. The HE-LTF symbols are, in some implementations, transmitted in the midamble (e.g., repeated transmissions, within the data symbols, of HE-LTF symbols sent in the preamble) to account for the time varying nature of the channel. The wireless packet structure is described further in the description of FIG. 2.

For example, an access point transmitting 16 spatial streams transmits 16 HE-LTF symbols, one for each spatial stream, and the corresponding channel estimate of the spatial stream that is determined at the receiver. In the current IEEE 802.11ax standard, an access point is required to transmit a 16×16 orthogonal P-matrix that in turn, requires the receiver to apply a Hermitian of the 16×16 orthogonal P-matrix to obtain the channel estimates for the 16 spatial streams. This matrix operation needs to be completed before decoding the first data symbol transmitted after the HE-LTF symbols, because the channel estimates are necessary to accurately decode the data transmitted over and affected by the channel. For the transmission of greater than 16 spatial streams in the current IEEE 802.11ax standard, more HE-LTF symbols are required along with an increased P-matrix sizes (e.g., 32×32 and 64×64).

Under the current IEEE 802.11ax standard, the receiver will multiply the received signal by a Hermitian of the 16×16 P-matrix to obtain the channel estimates for the 16 spatial streams. The application of the Hermitian of the P-matrix is referred to herein as an "undo P" operation. This operation, in order to be done in a short amount of time to obtain channel estimates necessary to process the data symbols immediately after receiving the preamble, requires a complicated receiver architecture to accomplish all of the arithmetic operations within the time available. As more transmission streams are used, the amount of arithmetic operations also increases. For example, transmitting 32 streams requires a 32×32 P-matrix on which the receiver is required to perform an undo P using another 32×32 matrix within the same time required for transmitting 16 streams or any number of streams.

Phase roll estimation, calculated by the receiver to refine both timing and channel estimates, also requires the determination of channel estimates of all spatial streams. In the current standard, phase roll estimation, like channel estimation, cannot be calculated until all HE-LTF symbols have been received. As the number of streams transmitted increases, the time that phase roll estimation is calculated is delayed further. Due to similar time constraints, QR decomposition operations to further process channel estimates, channel smoothing, channel interpolation, and other operations requiring the receipt of all LTF symbols, become increasingly difficult to implement when number of streams increase.

The advanced P-matrix design described herein achieves benefits such as supporting increasing number of transmission streams and reduces timing constraints due to the current, standard P-matrix design. The advanced P-matrix design allows for calculation of wireless channel properties such as channel estimates or phase roll estimates for a subset of the streams used for transmission after a corresponding subset of the HE-LTF symbols (e.g., 4 of 16 total HE-LTF symbols that correspond to streams 1-4 of a total 16 streams) are received instead of delaying calculation until all 16 HE-LTF symbols are received. Additional benefits of higher throughput with an increasing number of transmission streams can be achieved with an implementation of tone multiplexing for spatial streams. In some embodiments, a maximum of 8 rather than all 16 HE-LTF symbols are sent for estimating the channel of spatial streams that are multiplexed to a subset of total tones available for transmission. To increase the throughput of the access point, the time otherwise allocated for sending all 16 HE-LTF symbols is, in some embodiments, used to transmit other symbols.

In some implementations, the advanced P-matrix design is combined with the tone multiplexing for spatial streams at the access point for benefits seen in downlink multi-user (DL-MU) scenarios with regards to minimizing power fluctuation. For example, an access point performing DL-MU to 4 users having 4 spatial streams per user multiplexes HE-LTF symbols generated based on the advanced P-matrix design across a subset of tones (i.e., frequencies) available for transmission. For example, all 16 HE-LTF symbols are used such that both channel property calculations can be done prior to receiving all 16 HE-LTF symbols and streams for the four users can be multiplexed onto a subset of tones such that the average power for all streams multiplexed into each HE-LTF symbol does not vary substantially from the power determined from the high efficiency short training field (HE-STF) used for the automatic gain control (AGC) setting at the receiver. This combination is described further in the description of FIG. 4.

FIG. 1 is a block diagram of illustrative wireless communications system 100 for transmitting high efficiency long training field (HE-LTF) symbols 107, according to some embodiments described herein. In an embodiment, wireless communications system 100 includes control circuitry programmed to generate HE-LTF symbols 107, communicate HE-LTF symbols 107, and/or process the HE-LTF symbols 107. Although depicted in FIG. 2, wireless communications system 100 for transmitting and receiving HE-LTF symbols 107 is not limited to generation and processing of a preamble of a wireless packet. Along with a preamble, wireless communications system 100 includes a data payload, midamble, postamble, any suitable data sequence for transmission over a wireless communications system, or any combination thereof. For example, a midamble processing block is further coupled to the receiver to process HE-LTF symbols transmitted in the midamble.

Preamble generation 101 is a process for generating the preamble of a wireless packet to be transmitted over a wireless channel having properties, estimated by system 100 through training matrices, such as channel response or channel estimate matrix H (e.g., an estimate of the effect of a wireless channel on the amplitude and phase of a transmitted signal) and carrier phase error $\varphi$ (e.g., a distortion in the received phase of a signal transmitted over a wireless channel over time). Preamble generation 101 is, in some implementations, included in control circuitry that is coupled to transmitter 102 and comprises PHY and MAC processors. The advanced P-matrix generation and tone multiplexing described herein take place, in some embodiments, at the PHY layer with the associated PHY processor. Parameter selection for the PHY processes (e.g., tone-select mode parameter selection for tone multiplexing) takes place, in some embodiments, at the MAC layer with the associated MAC processor. The MAC processor decides, in some implementations, which of the advanced P-matrix, tone multiplexing, or the combination thereof to implement.

In some embodiments, the generated preamble, for wireless packets transmitted over data tones (e.g., frequencies designated for data symbol transmission), includes symbols mapped by LTF mapping matrices such as a P-matrix for estimating the channel response and for wireless packets transmitted over pilot tones (e.g., frequencies designated for pilot symbol transmission), an R-matrix for estimating the carrier phase error. The generated preamble is transmitted over the wireless channel by transmitter 102 using antennas 103. The transmitted preamble, in some implementations, includes the HE-LTF symbols mapped by an LTF mapping matrix (e.g., the P-matrix having the design described herein), multiplexed over tones, or a combination thereof.

As referred to herein, "mapped by" or "mapping" relates to an arithmetic operation involving a linear transformation (e.g., through addition and multiplication) of a first set of values in a first matrix to a second set of values in a second matrix through the application of a third matrix onto the first matrix.

Antennas 104 coupled to receiver 105 receive the preamble transmitted by transmitter 102. Receiver 105, as shown in FIG. 1, is coupled to preamble processing 106 which processes the received preamble. In some embodiments, preamble processing 106 processes the HE-LTF symbols within the preamble by applying a Hermitian of a fixed matrix to a portion of the received LTF mapping matrix such that the resulting product is an identity matrix (e.g., an "undo P" operation) and matrix or value representative of a channel property. Preamble processing 106 is, in some implementations, included in control circuitry coupled to receiver 105. For example, preamble processing 106 processes 4 HE-LTF symbols by applying a Hermitian of a 4×4 P-matrix to the first four columns of a 16×16 P-Matrix received over the 4 HE-LTF symbols such that the resulting product is an identity matrix and a channel response matrix, H.

Figure 2:
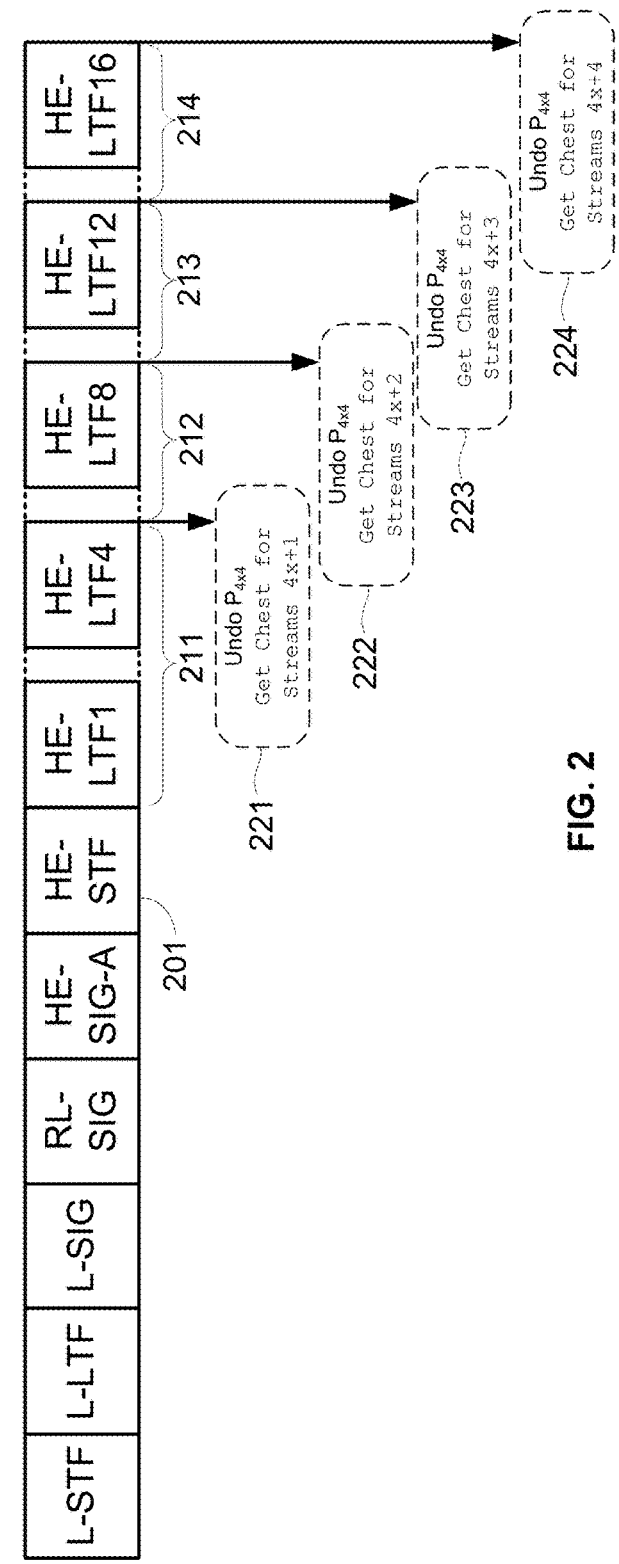
FIG. 2 is a diagram of an illustrative preamble containing HE-LTF symbols, generated based on an advanced P-matrix design described herein, transmitted over the illustrative wireless communications system of FIG. 1 in accordance with at least some embodiments of the present disclosure.

FIG. 2 is a diagram of illustrative preamble 200 containing HE-LTF symbols, generated based on an advanced P-matrix design described herein, transmitted over the illustrative wireless communications system of FIG. 1, according to some embodiments described herein. Preamble 200 includes HE-STF symbol 201 and HE-LTF symbols 1 through 16 that are grouped such that group 211 includes HE-LTF1 through HE-LTF4, group 212 includes HE-LTF5 through HE-LTF8, group 213 includes HE-LTF9 through HE-LTF12, and group 213 includes HE-LTF13 through HE-LTF16. Preamble processing 106 determines channel properties after each group is received rather than delay calculation of channel properties until after all 16 HE-LTF symbols are received, in an embodiment. FIG. 2 depicts calculations 221-224 performed to obtain channel properties (e.g., "Chest" or channel estimate) associated with a subset of streams after each group of HE-LTF symbols is received.

In one implementation, transmitter 102 is used to transmit 16 spatial streams. Following the current IEEE 802.11ax standard, the transmitter 102 uses a 16×16 P-matrix. The undo P operation for a 16×16 P-matrix requires a computational complexity that increases as the number of spatial streams transmitted increases. The advanced P-matrix design as described herein has the benefit of maintaining manageable complexity at a receiver performing undo P operations such as calculations 221-224. For a 16-stream transmission that would require a 16×16 P-matrix under current standards, a P-matrix is designed based on rows of smaller 4×4 P-matrices arranged in an interleaved format of a block diagonal P-matrix.

Standards for IEEE 802.11ax wireless communications systems define a 2×2, 4×4, 6×6, and 8×8 P-matrix. In some embodiments, the advanced P-matrix design for processing channel estimates prior to receiving all HE-LTF symbols is composed of the pre-defined or fixed P-matrices defined in the standard. For example, a 16×16 P-matrix (e.g., $P_{16 \times 16}$) for a 16-stream transmission may be constructed using a 4×4 matrix. The first 4 columns of $P_{16 \times 16}$ include $P_{4 \times 4}^1$, $P_{4 \times 4}^2$, $P_{4 \times 4}^3$, and $P_{4 \times 4}^4$ located at the $1^{st}$, $5^{th}$, $9^{th}$, and $13^{th}$ rows, respectively. $P_{4 \times 4}^N$ as used in this example denotes the Nth row of a standard 4×4 P-matrix. Specifically, $P_{4 \times 4}^1$ occupies the first 4 columns and row 1 of $P_{16 \times 16}$, $P_{4 \times 4}^2$ occupies the first 4 columns and row 5 of $P_{16 \times 16}$, $P_{4 \times 4}^3$ occupies the first 4 columns and row 9 of $P_{16 \times 16}$, and $P_{4 \times 4}^4$ occupies the first 4 columns and row 13 of $P_{16 \times 16}$. In the $5^{th}$ through $8^{th}$ column of $P_{16 \times 16}$, $P_{4 \times 4}^1$, $P_{4 \times 4}^2$, $P_{4 \times 4}^3$, and $P_{4 \times 4}^4$ are located at the $2^{nd}$, $6^{th}$, $10^{th}$, and $14^{th}$ rows, respectively. In the $9^{th}$ through $12^{th}$ columns of $P_{16 \times 16}$, $P_{4 \times 4}^1$, $P_{4 \times 4}^2$, $P_{4 \times 4}^3$, and $P_{4 \times 4}^4$ are located at the $3^{rd}$, $7^{th}$, $11^{th}$, and $15^{th}$ rows, respectively. In the $13^{th}$ through $16^{th}$ columns of $P_{16 \times 16}$, $P_{4 \times 4}^1$, $P_{4 \times 4}^2$, $P_{4 \times 4}^3$, and $P_{4 \times 4}^4$ are located at the $4^{th}$, $8^{th}$, $12^{th}$, and $16^{th}$ rows, respectively. The resultant $P_{16 \times 16}$ is shown below, where $Z_{1 \times 4}$ denotes a 1×4 zero matrix.

$$P_{16 \times 16} = \begin{bmatrix} P_{4 \times 4}^1 & Z_{1 \times 4} & Z_{1 \times 4} & Z_{1 \times 4} \\ Z_{1 \times 4} & P_{4 \times 4}^1 & Z_{1 \times 4} & Z_{1 \times 4} \\ Z_{1 \times 4} & Z_{1 \times 4} & P_{4 \times 4}^1 & Z_{1 \times 4} \\ Z_{1 \times 4} & Z_{1 \times 4} & Z_{1 \times 4} & P_{4 \times 4}^1 \\ P_{4 \times 4}^2 & Z_{1 \times 4} & Z_{1 \times 4} & Z_{1 \times 4} \\ Z_{1 \times 4} & P_{4 \times 4}^2 & Z_{1 \times 4} & Z_{1 \times 4} \\ Z_{1 \times 4} & Z_{1 \times 4} & P_{4 \times 4}^2 & Z_{1 \times 4} \\ Z_{1 \times 4} & Z_{1 \times 4} & Z_{1 \times 4} & P_{4 \times 4}^2 \\ P_{4 \times 4}^3 & Z_{1 \times 4} & Z_{1 \times 4} & Z_{1 \times 4} \\ Z_{1 \times 4} & P_{4 \times 4}^3 & Z_{1 \times 4} & Z_{1 \times 4} \\ Z_{1 \times 4} & Z_{1 \times 4} & P_{4 \times 4}^3 & Z_{1 \times 4} \\ Z_{1 \times 4} & Z_{1 \times 4} & Z_{1 \times 4} & P_{4 \times 4}^3 \\ P_{4 \times 4}^4 & Z_{1 \times 4} & Z_{1 \times 4} & Z_{1 \times 4} \\ Z_{1 \times 4} & P_{4 \times 4}^4 & Z_{1 \times 4} & Z_{1 \times 4} \\ Z_{1 \times 4} & Z_{1 \times 4} & P_{4 \times 4}^4 & Z_{1 \times 4} \\ Z_{1 \times 4} & Z_{1 \times 4} & Z_{1 \times 4} & P_{4 \times 4}^4 \end{bmatrix}$$

At receiver 105, the sequence of HE-LTF symbols is mapped using the ith column of $P_{16 \times 16}$ as depicted (i.e., the ith column has dimensions of 16×4) is received after the ith group of groups 211-214 (e.g., $1^{st}$ group is group 211). After receiving group 211 of HE-LTF symbols, preamble processing 106 applies a Hermitian of the 4×4 P-matrix, as defined in the standard, to the HE-LTF symbols transmitted within group 211 after removing their polarity. This application is the undo P of calculation 221. The resulting matrix is representative of the channel estimate for streams 4x+1 (e.g., the $1^{st}$, $5^{th}$, $9^{th}$, and $13^{th}$ streams) where x=1, 2, 3, and 4 corresponding to users 1-4 having the (4x+1)th stream allocated to them, respectively. After receiving group 212 of HE-LTF symbols, preamble processing 106 applies the Hermitian of the 4×4 P-matrix to the HE-LTF symbols transmitted within group 212 after removing their polarity. This application is the undo P of calculation 222. The resulting matrix is representative of the channel estimate for streams 4x+2 (e.g., the $2^{nd}$, $6^{th}$, $10^{th}$, and $14^{th}$ streams) where x=1, 2, 3, and 4 corresponding to users 1-4 having the (4x+2)th stream allocated to them, respectively. After receiving group 213 of HE-LTF symbols, preamble processing 106 applies the Hermitian of the 4×4 P-matrix to the HE-LTF symbols transmitted within group 213 after removing their polarity. This application is the undo P of calculation 223. The resulting matrix is representative of the channel estimate for streams 4x+3 (e.g., the $3^{rd}$, $7^{th}$, $11^{th}$, and $15^{th}$ streams) where x=1, 2, 3, and 4 corresponding to users 1-4 having the (4x+3)th stream allocated to them, respectively. After receiving group 214 of HE-LTF symbols, preamble processing 106 applies the Hermitian of the 4×4

P-matrix to the HE-LTF symbols transmitted within group 214 after removing their polarity. This application is the undo P of calculation 224. The resulting matrix is representative of the channel estimate for streams 4x+4 (e.g., the $4^{th}$, $8^{th}$, $12^{th}$, and $16^{th}$ streams) where x=1, 2, 3, and 4 corresponding to users 1-4 having the (4x+4)th stream allocated to them, respectively.

Using smaller P-matrices to process subsets of HE-LTF symbols rather than using a full-sized P-matrix to process the HE-LTF symbols after receiving them all has advantages. For example, after processing group 211 and before receiving groups 212-214, the channel estimates for 4 of 16 streams are available, phase roll computation can begin, channel smoothing and/or interpolation for 4 of 16 streams can be performed, other suitable channel enhancements (e.g., noise whitening and L-LTF-HE/VHTLTF1 combining) can be performed, or any suitable combination thereof. These benefits similarly apply to each group of groups 212-214. Preamble processing 106, in some implementations, finishes processing the preamble with manageable computational complexity in time for additional processing components of receiver 105 to process the data payload of the wireless packet using the determined channel estimates.

The construction method for $P_{16\times16}$ described above is, in some implementations, extendable to any general P-matrix size. For example, $P_{18\times18}$ can be generated using the $P_{16\times16}$ matrix and appending a $P_{2\times2}$, as defined in the standard, at a diagonal position such that it occupies the space defined by the intersection of the $17^{th}$ and $18^{th}$ rows and columns. For spatial mapping matrix Q used by the transmitter, in some embodiments, the Q matrix does not have any of its elements as 0. This prevents power from being spread on all transmitted spatial streams during each transmitted LTF symbol. Non-zero elements in the Q-matrix map power allocation by the transmitter to all possible spatial streams usable by the transmitter, which may be a larger number of spatial streams than is used for transmission. Hence, the mapped power allocation by the transmitter is not isolated to transmitted spatial streams.

Carrier phase error (CPE) compensation is, in some embodiments, achieved through the implementation of the advanced P-matrix design described herein. Up-link (UL) packets are frequency synchronized up to +/−400 Hz (e.g., within a range of 400 Hz), and CPE is not expected to build up significantly over a few HE-LTF symbols (e.g., four or less HE-LTF symbols). However, as the total number of streams and accordingly, HE-LTF symbols transmitted increases, the CPE build up increases and impacts HE-LTF symbols received later in the sequence of transmitted HE-LTF symbols significantly.

In some embodiments, transmitter 102 uses at least 16 antennas (e.g., antennas 103) to communicate with 4 users. Each user sends 4 streams of UL packets. Hence, the total number of HE-LTF symbols in an UL packet is 16 HE-LTF symbols. Using the advanced P-matrix design, rows 1 through 4 of the $P_{16\times16}$ correspond to user 1, rows 5 through 8 correspond to user 2, rows 9 through 12 correspond to user 3, and rows 13 through 16 correspond to user 4. The advanced P-matrix described earlier for channel estimation is used for mapping HE-LTF symbols transmitted over data tones while pilot tones are mapped using an R-matrix created through an advanced R-matrix design.

The R-matrix, in some implementations, is designed based on the $P_{16\times16}$ used for channel estimation. Columns 1 through 4 of $P_{16\times16}$ are used for columns 1 through 16 of $R_{16\times16}$ shown below.

$$P_{16\times16} = \begin{bmatrix} P^1_{4\times4} & P^1_{4\times4} & P^1_{4\times4} & P^1_{4\times4} \\ Z_{1\times4} & Z_{1\times4} & Z_{1\times4} & Z_{1\times4} \\ Z_{1\times4} & Z_{1\times4} & Z_{1\times4} & Z_{1\times4} \\ Z_{1\times4} & Z_{1\times4} & Z_{1\times4} & Z_{1\times4} \\ P^2_{4\times4} & P^2_{4\times4} & P^2_{4\times4} & P^2_{4\times4} \\ Z_{1\times4} & Z_{1\times4} & Z_{1\times4} & Z_{1\times4} \\ Z_{1\times4} & Z_{1\times4} & Z_{1\times4} & Z_{1\times4} \\ Z_{1\times4} & Z_{1\times4} & Z_{1\times4} & Z_{1\times4} \\ P^3_{4\times4} & P^3_{4\times4} & P^3_{4\times4} & P^3_{4\times4} \\ Z_{1\times4} & Z_{1\times4} & Z_{1\times4} & Z_{1\times4} \\ Z_{1\times4} & Z_{1\times4} & Z_{1\times4} & Z_{1\times4} \\ Z_{1\times4} & Z_{1\times4} & Z_{1\times4} & Z_{1\times4} \\ P^4_{4\times4} & P^4_{4\times4} & P^4_{4\times4} & P^4_{4\times4} \\ Z_{1\times4} & Z_{1\times4} & Z_{1\times4} & Z_{1\times4} \\ Z_{1\times4} & Z_{1\times4} & Z_{1\times4} & Z_{1\times4} \\ Z_{1\times4} & Z_{1\times4} & Z_{1\times4} & Z_{1\times4} \end{bmatrix}$$

Preamble processor 106 at the receiver performs, in some embodiments, the following operations for each group of 4 HE-LTF symbols received. After receiving the first 4 HE-LTF symbols (i.e., HE-LTF1 through HE-LTF4), preamble processor 106 performs an undo P using a fixed matrix (e.g., a row of a 4×4 P-matrix defined in the standard) on pilot tones of first 4 HE-LTF symbols such that the channel estimates for a stream used by each user is obtained (e.g., stream 1 for user 1, user 2, user 3, and user 4). After receiving the second group of 4 HE-LTF symbols (i.e., HE-LTF5-8), preamble processor 106 performs an undo P on the pilot tones of first 4 HE-LTF symbols to estimate a per-user CPE on pilot tones using the channel estimates obtained from the first 4 HE-LTF symbols. The channel estimates for data tones, obtained from an undo P applied to HE-LTF5 through HE-LTF8 on the data tones, can be compensated based on the estimated CPE. This results in CPE-compensated channel estimates for the second stream of each user. Likewise, the CPE-compensated channel estimates for the third stream and fourth streams of each user can be calculated after receiving HE-LTF9 through HE-LTF12 and HE-LTF13 through HE-LTF16, respectively.

The following is an example of a process at preamble processing 106 for the CPE-compensation described above. In this example, an access point has 16 antennas that are used for the transmission of HE-LTF symbols to users 1, 2, 3, and 4 associated with 16×4-dimensioned channel responses $H_{u1,k}$, $H_{u2,k}$, $H_{u3,k}$, and $H_{u4,k}$, respectively, where k is the index of a data tone. In some embodiments, the CPE build up within the first 4 HE-LTF symbols is small. After receiving HE-LTF4, preamble processor 106 processes signal $Y_{1,k}$ below.

$$Y_{1,k} = [H_{u1,k}(:,1) H_{u2,k}(:,1) H_{u3,k}(:,1) H_{u4,k}(:,1)] \cdot P_{4\times4}$$

An undo P operation results in calculations of the estimated first stream of each user.

$$Y_{1,k} \cdot P_{4\times4}^H = [H_{u1,k}(:,1) H_{u2,k}(:,1) H_{u3,k}(:,1) H_{u4,k}(:,1)]$$

The CPE build up at the end of received HE-LTF4 is denoted as $\theta_{u1}$, $\theta_{u2}$, $\theta_{u3}$, and $\theta_{u4}$ of users 1, 2, 3, and 4, respectively. A 4×4 CPE matrix is denoted by $\phi = \text{diag}(e^{j\theta_{u1}}, e^{j\theta_{u2}}, e^{j\theta_{u3}}, e^{j\theta_{u4}})$. After receiving HE-LTF8, preamble processor 106 processes signal $Y_{2,k}$ below.

$$Y_{2,k} = [H_{u1,k}(:,1) H_{u2,k}(:,1) H_{u3,k}(:,1) H_{u4,k}(:,1)] \cdot \phi P_{4\times4}$$

An undo P operation using $P_{4\times4}^H$ and a subsequent zero forcing operation are used to obtain the per-user CPE estimates within ϕ.

$$H^d Y_{2,k} \cdot P_{4\times4}^H = H^d[H_{u1,k}(:,1)H_{u2,k}(:,1)H_{u3,k}(:,1)H_{u4,k}(:,1)] \cdot \phi P_{4\times4} \cdot P_{4\times4}^H = \phi$$

where $H^d$ is the pseudo inverse of $[H_{u1,k}(:,1)H_{u2,k}(:,1)H_{u3,k}(:,1)H_{u4,k}(:,1)]$.

After obtaining the per-user CPE estimates, ϕ, preamble processor 106 may use a Hermitian of ϕ, $\phi^H$, to compensate for CPE in the channel estimates obtained through calculations applied to HE-LTF symbols transmitted over data tones. Let m denote the tone index of a data tone. After receiving HE-LTF8, preamble processor 106 processes signal $Y_{2,m}$ using an undo P and undo ϕ operation.

$$Y_{2,m} = [H_{u1,m}(:,2)H_{u2,m}(:,2)H_{u3,m}(:,2)H_{u4,m}(:,2)] \cdot \phi P_{4\times4}$$

$$Y_{2,m} \cdot P_{4\times4}^H \phi^H = [H_{u1,m}(:,2)H_{u2,m}(:,2)H_{u3,m}(:,2)H_{u4,m}(:,2)]$$

A similar CPE compensation for channel estimates is performed after HE-LTF12 and HE-LTF16 to determine CPE-compensated estimates for $3^{rd}$ and $4^{th}$ streams of each user.

To avoid CPE build up over 4 HE-LTF symbols, in some embodiments, HE2× or HE1×LTF is used in the UL packet. The base P-matrix considered in this case is a standard 4×4 P-matrix. For more users, in some implementations, a larger base P-matrix is used of size equal to the number of users. For example, an orthogonal 16×16 base P-matrix is used for 16 users having 2 spatial streams allocated per user. The base P-matrix is used in the generation of a 32×32 P-matrix (i.e., 32 total streams based on the 2 streams for each of the 16 users). Rows of zeroes are inserted between every two rows of the base P-matrix to form a 32×16 matrix and is concatenated with a copy of the 32×16 matrix whose rows are shifted cyclically down by 1 to form a 32×32 matrix.

$$P_{32\times32} = [P_{32\times16} P'_{32\times16}]$$

Figure 3:
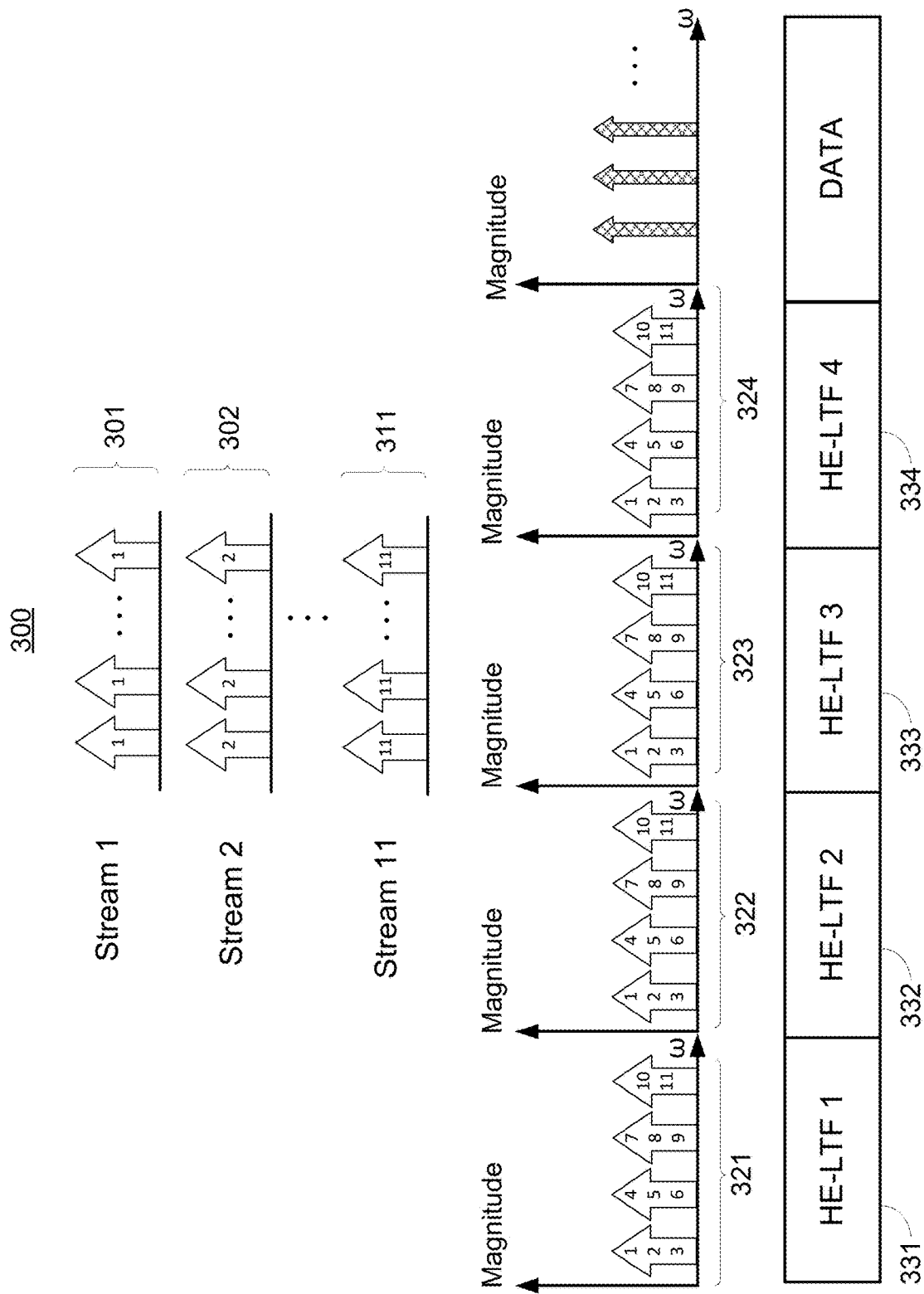
FIG. 3 is a diagram of an illustrative transmission of HE-LTF symbols, over the illustrative wireless communications system of FIG. 1, based on tone multiplexing for wireless spatial streams in accordance with at least some embodiments of the present disclosure.

FIG. 3 is a diagram of illustrative transmission 300 of HE-LTF symbols, over the illustrative wireless communications system of FIG. 1, based on tone multiplexing for wireless spatial streams, according to some embodiments described herein. Throughput of the transmission of wireless packets by transmitter 102 is, in some implementations, increased due to multiplexing of multiple streams on tones in a wireless channel. Tone multiplexing for spatial streams reduces the amount of HE-LTF symbols necessary to transmit channel estimates for an increasing number of spatial streams (e.g., up to 32 spatial streams for the current maximum 8×8 P-matrix defined by the standard) by distributing the transmission of spatial streams across tones.

The IEEE 802.11ax standard defines three HE-LTF transmission modes: 1x, 2x, and 4x. Each HE-LTF transmission mode or "HE mode" is representative of a maximum number of tones available for transmission. As defined in the 802.11ax, there are 256 tones available for 4×HE-LTF mode, 128 tones available for 2×HE-LTF mode, and 64 tones available for 1×HE-LTF mode. For up to 8 spatial streams, a P-matrix is defined in 802.11ax. Using the tone multiplexing described herein, transmission using a number of spatial streams greater than 8 involves maintaining a P-matrix dimension up to 8 in combination with the three HE-LTF modes to obtain channel estimates for more than 8 spatial streams. The maximum number of HE-LTF symbols transmitted is, in some embodiments, 8 HE-LTF symbols (i.e., limited by the maximum P-matrix dimension of 8).

In 4×HE-LTF mode, the 802.11ax standard defines an FFT size or number of tones available for transmission as 256 tones. The tones are, in some implementations, divided based on a tone-select mode: tone-select mode 1, tone-select mode 2, and tone-select mode 4. For tone select-mode 1 in 4×HE-LTF mode, the number of tones available are divided into four sets or groups of tones. Set 1 includes tone indices {4x}, set 2 includes tone indices {4x+1}, set 3 includes tone indices {4x+2}, and set 4 includes tone indices {4x+3}, where $$x = \left\{0, \ldots, \frac{FFTsize}{4} - 1\right\}.$$

FFTsize corresponds to the number of available tones. For tone-select mode 1 with FFTsize=256, set 1 includes tone indices {0, 4, 8, . . . , 252}, set 2 includes tone indices {1, 5, 9, . . . , 253}, set 3 includes tone indices {2, 6, 10, . . . , 254}, and set 4 includes tone indices {3, 7, 11, . . . , 255}. For tone-select mode 2 in 4×HE-LTF mode, the number of tones available are divided into two sets of tones. Set 1 includes tone indices {2x} and set 2 includes tone indices {2x+1}, where $$x = \left\{0, \ldots, \frac{FFTsize}{4} - 1\right\}.$$

For tone-select mode 2 with FFTsize=256, set 1 includes tone indices {0, 2, 4, . . . , 254} and set 2 includes tone indices {1, 3, 5, . . . , 255}. For tone-select mode 4 in 4×HE-LTF mode, the number of tones available are not divided. This follows the current IEEE 802.11ax definition of HE-LTF. Using the 8×8 P-matrix defined for IEEE 802.11ax, up to 8 streams are supported in tone-select mode 4, up to 16 streams are supported in tone-select mode 2, and up to 32 streams are supported in tone-select mode 1 (i.e., 8 streams for each of the four sets).

The number of streams to be transmitted by transmitter 102 are, in some embodiments, divided among the sets. In each set, at least $$\left\lfloor \frac{N_{sts}}{4/m} \right\rfloor$$

streams are present, where m denotes a tone-select mode (e.g., m=1, 2, or 4). The remaining streams, $$N_{sts,rem} = \left(N_{sts} - \left(\frac{4}{m}\right)\left\lfloor \frac{N_{sts}}{\frac{4}{m}} \right\rfloor\right),$$

are divided equally among the first $N_{sts,rem}$ sets. For example, 11 spatial streams are divided among four sets in tone-select mode 1 by first assigning 2 streams in each four groups, leaving 3 spatial streams remaining that are unassigned. The $N_{sts,rem}$=3 streams are divided equally among the first 3 sets, producing the stream assignment of {3, 3, 3, 2} (i.e., 3 streams in the first set, 3 streams in the second set, 3 streams in the third set, and 2 streams in the fourth set). In a second example, 13 spatial streams are divided among four sets in tone-select mode 1 by assigning 3 streams to each set and assigning the remaining 1 stream to the first set, producing a stream assignment of {4, 3, 3, 3}. In a third example, 13 spatial streams are divided among two sets in tone-select mode 2 by assigning 6 streams to each set and assigning the remaining 1 stream to the first set, producing a stream assignment of {7, 6}.

The stream assignment of {3, 3, 3, 2} is depicted in FIG. 3, where streams 301-311 correspond to the 11 streams to be transmitted. The streams are depicted as arrows representing a frequency response of a signal to be transmitted for each stream, where the signals are labeled with the associated stream number (e.g., the signal to be sent through stream 1 is labeled with a "1" in the arrows). The signals for the $1^{st}$, $2^{nd}$, and $3^{rd}$ streams are multiplexed onto set 1 tones {0, 4, 8, . . . , 252}. The signals for the $4^{th}$, $5^{th}$, and $6^{th}$ streams are multiplexed onto set 2 tones {1, 5, 9, . . . , 253}. The signals for the $7^{th}$, $8^{th}$, and $9^{th}$ streams are multiplexed onto set 3 tones {2, 6, 10, . . . , 254}. The signals for the $10^{th}$ and $11^{th}$ streams are multiplexed onto set 4 tones {3, 7, 11, . . . , 255}.

The HE-LTF symbols are generated by preamble generation 101, in some embodiments, according to the assignment of streams to tones and standard P-matrix that is selected according to the maximum number of streams transmitted across a set of tones (e.g., select a standard 4×4 P-matrix for the set {3, 3, 3, 2} because a 4×4 P-matrix is used for up to 4 streams). The signal transmitted by transmitter 102 is, in some embodiments, given by $$y = H_{N_r \times N_t} Q_{N_t \times N_{sts}} P_{N_{sts}}$$

where H is a channel response matrix having a number of rows Nr, the number of antennas at a receiver (e.g., number of antennas 104), and a number of columns $N_t$, the number of antennas at a transmitter (e.g., number of antennas 103), Q is a spatial mapping matrix having a number of rows $N_t$ and a number of columns $N_{sts}$, the number of transmitted spatial streams, and P is a square $N_{sts}$ P-matrix.

For a set i, the received signal is represented by $$y(i) = H_{N_r \times N_t} Q(i)_{N_t \times N_{sts,i}} P(N_{sts,i})_{\max_i(N_{sts,i})}$$

where $Q = [Q_{N_t \times N_{sts,1}}(1), \ldots, Q_{N_t \times N_{sts,m}}(4/m)]$, m is the tone-select mode, a horizontal concatenation of matrices representative of the spatial mapping for $N_{sts,i}$, the number of spatial streams in set i, and $$P(N_{sts,i})_{\max_i(N_{sts,i})}$$

is based on a standard P-matrix.

$$P(N_{sts,i})_{\max_i(N_{sts,i})}$$

is constructed using the first $N_{sts,i}$ rows of a standard P-matrix. For example, for the spatial stream assignment of {3, 3, 3, 2} for 11 spatial streams using tone-select mode 1 and 4×HE-LTF mode, $N_{sts,i=1} = 3$ and $$\max_i(N_{sts,i}) = 4$$

given the maximum P-matrix sizes in the 802.11ax definition are a 2×2, 4×4, 6×6, and 8×8. $P(3)_4$ is 3×4 matrix constructed using the first 3 rows of the standard 4×4 P-matrix.

Based on the number of spatial streams and the tone-select mode indicated in the SIG fields (e.g., SIGA field, according to the 802.11ax standard, of a wireless packet preamble), the receiver (e.g., receiver 105) constructs, in some implementations, the number of streams per set of tones and select the appropriate P-matrix for HE-LTF symbol processing. For example, receiver 105 determines from the SIG fields that the stream assignment of {3, 3, 3, 2} was used for the transmission of the received wireless packet and selects a standard 4×4 P-matrix for processing the received HE-LTF symbols. For a stream assignment of {7,6}, the receiver selects a standard 8×8 P-matrix for processing the received HE-LTF symbols. The standard 8×8 P-matrix is selected because the standard 8×8 P-matrix has sufficient dimension to perform an undo P operation on the transmitted P-matrix, which has a dimension of $N_{sts,i}$ rows and a number of columns corresponding to the dimension of the smallest P-matrix size that is still greater than the maximum number of spatial streams in any set. To obtain the channel estimates for the spatial streams across a subset of tones (e.g., tones {0, 4, 8, . . . , 252}), the receiver applies a selected P-matrix as shown by $$y(1) \cdot P_{4 \times 4}{}^H = H_{N_r \times N_t} Q(1)_{N_t \times 3} P(3)_4 \times P_{4 \times 4}{}^H$$

The resulting $H_{N_r \times N_t} Q(1)_{N_t \times 3}$ is representative of the channel response of the spatial streams of set 1 transmitted over tones {0, 4, 8, . . . , 252}. To obtain the channel response of the spatial streams of set 1 transmitted over the remaining tones {1, 2, 3, 5, 6, 7, . . . , 253, 254, 255}, preamble processor 106, in some embodiments, interpolates the channel response $H_{N_r \times N_t} Q(1)_{N_t \times 3}$.

For the stream assignment of {3, 3, 3, 2} depicted in FIG. 3, frequency response 321 represents streams 1-3 multiplexed onto tones {0, 4, . . . , 252} over set 1, streams 4-6 multiplexed onto tones {1, 5, . . . , 253} over set 2, streams 7-8 multiplexed onto tones {2, 6, . . . , 254} over set 3, and streams 1-3 multiplexed onto tones {3, 7, . . . , 255} over set 4. Frequency responses 322 through 324 also contain the stream sets multiplexed over tones based on the mapping scheme for frequency response 321. Although only four frequencies (i.e., the four arrows) are depicted in each of frequency responses 321-324 for ease of depiction, each frequency response spans all tones allocated for a particular HE-LTF mode (e.g., 256 tones for 4×HE-LTF mode).

HE-LTF symbols transmitted are HE-LTF symbols 331-334 corresponding to HE-LTF1 through HE-LTF4. The four sets of spatial streams are loaded onto HE-LTF1 symbol 331 by applying an inverse fast Fourier transform (IFFT) to frequency response 321 to obtain a time domain representation to be transmitted over the wireless channel. HE-LTF symbols 332-334 are obtained similarly from frequency responses 322-324, respectively. In some embodiments, the jth HE-LTF symbol transmitted is formed using the corresponding jth column of a modified P-matrix that is modified by using only a subset of rows of a standard P-matrix. For example, for the stream assignment {3, 3, 3, 2} of FIG. 3, the standard P-matrix used is the 4×4 P-matrix defined in IEEE 802.11ax.

The following values, in some implementations, correspond to the loaded values within HE-LTF symbols 331-334. For symbol 331, a $N_t \times 1$ value is associated with set 1 representing streams 1-3 based on a matrix calculation involving a Q-matrix and a column of a P-matrix, where $N_t$ represents the number of transmit antennas. Symbols 332-334 are likewise associated with a $N_t \times 1$ value representing the spatial streams assigned to the set. In particular, the loaded values to HE-LTF symbols 331-334 correspond to $Q_{N_t \times N_{sts}} P_{N_{sts} \times 4}(:,j)$, where j reflects the jth HE-LTF symbol and $P_{N_{sts} \times 4}$ is a matrix of the first $N_{sts}$ rows of the standard 4×4 P-matrix.

As arranged in FIG. 3, symbol 331 is received first, symbol 332 is received second, symbol 333 is received third, and symbol 334 is received fourth and last of the HE-LTF symbols. The data payload is received, in some implementations, immediately after symbol 334 is received (e.g., there are no additional HE-LTF symbols received after symbol 334 is received).

In some embodiments, a 2×HE-LTF mode is used. In 2×HE-LTF mode, associated with 128 possible tones available for transmission, up to 8 streams are supported in tone-select mode 2 and up to 16 streams are supported in tone-select mode 1 (e.g., 2 sets of 64 tones, each set supporting 8 streams). The 1×HE-LTF mode supports, in some embodiments, a cyclic prefix duration of only 0.8 us while using 2×HE-LTF mode with tone-select mode 1 supports all cyclic prefix modes.

The different sets of tones are, in some implementations, assigned to different users. In the IEEE 802.11ax standard, pilot tones are not available in all sets of spatial streams. For example, in tone-select mode 1 for 4×HE-LTF mode, the second and fourth sets of spatial streams do not have any pilot tones. In another example, in tone-select mode 2 for 4×HE-LTF mode, the second set of spatial streams does not have any pilot tones. The new set of pilot tones in each set is, in some embodiments, required for CPE estimation from the corresponding user. If there are more than four users present, in some implementations, then the assignment of users to tones are divided similar to how the assignment of spatial sets are divided among tones. For an odd number of users greater than four users, no change is necessary to conform the spatial stream assignment to a user assignment. For three users, one of the users is allocated 2 sets of tones rather than a single set of tones.

When the number of users is less than or equal to 4, the HE-LTF from different users are, in some implementations, present in different tones. Calibration-related issues from one user does not affect the channel estimation for other users. Additionally, a separate CPE estimation is needed for each user. Carrier frequency offset (CFO) estimation is performed, in some embodiments, per user and the effective CFO correction is computed and applied to obtain channel estimates. When the number of users is greater than 4, the overlapping of users in each tone is, in some implementations, limited and in turn, reduces the estimation error.

Figure 4:
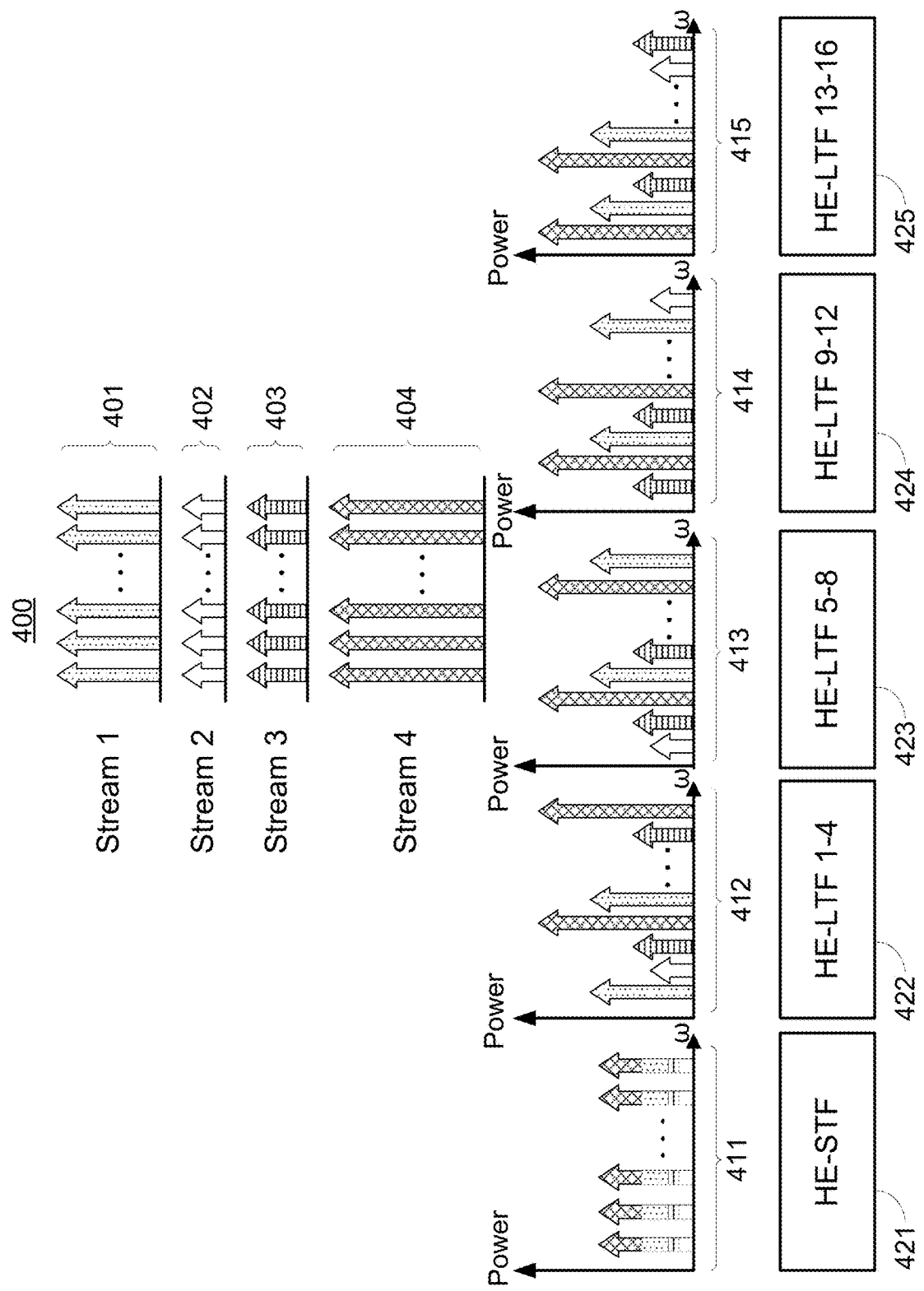
FIG. 4 is a diagram of an illustrative transmission of HE-LTF symbols, generated based on a combination of the advanced P-matrix design of FIG. 2 and the tone multiplexing of FIG. 3 in accordance with at least some embodiments of the present disclosure.

FIG. 4 is a diagram of illustrative transmission 400 of HE-LTF symbols for a single user allocated 4 spatial streams, generated based on a combination of the advanced P-matrix design of FIG. 2 and the tone multiplexing of FIG. 3, according to some embodiments described herein. A combination of the advanced P-matrix design and tone multiplexing is, in some embodiments, applicable to achieve transmission benefits (e.g., avoiding power fluctuations) in down-link multi-user (DL-MU) transmissions.

The receiver complexity, in some implementations, allows for a certain computational complexity for an undo P operation (e.g., undo P up to a 4×4 P-matrix). In some embodiments, a transmitter applies only the advanced P-matrix design and the HE-STF is represented by $$HESTF_k = H*Q_{mat}*ones(16,1)$$

where k represents a tone index k, and $Q_{mat}$ is a precoder matrix (i.e., Q for a multi-user or beamformed steered transmission system is known as a precoder matrix while Q for a single-user transmission system is a spatial mapping matrix) and the transmitted HE-LTF symbols are represented by $$[HELTF_k^1, HELTF_k^2, \ldots, HELTF_k^{16}] = [H* \\ Qmat_{(1:1:16) \times (1:4:16)} *P_{4 \times 4} H*Qmat_{(1:1:16) \times (2:4:16)} \\ *P_{4 \times 4} H*Qmat_{(1:1:16) \times (3:4:16)} *P_{4 \times 4} H* \\ Qmat_{(1:1:16) \times (4:4:16)} *P_{4 \times 4}]$$

Due to potential differences in power between spatial stream transmissions or user transmissions (e.g., for DL-MU transmissions), power fluctuations occur between HE-LTF symbols received over channel H. By multiplexing spatial streams onto tones in addition to the advanced P-matrix design, the power fluctuations are avoided.

To combine tone multiplexing with the advanced P-matrix design, the N streams of all users are multiplexed across tones in N HE-LTF symbols. As shown in FIG. 4, four streams 401-404 are transmitted for a single user (i.e., 4 streams in total). Each stream is depicted with a different hatching within the arrows representing the frequency response of the signal in the stream.

For HE-STF symbol 411, all tones in corresponding frequency response 411 are used to send all streams, resulting in an HE-STF power that is an average of the power of the individual streams. For HE-LTF symbols 1 through 16, depicted in groups of 4 in symbol groups 422-425, the streams are transmitted according to an assignment of spatial stream to tone subset. For frequency response 412 and corresponding HE-LTF symbol group 422, the $1^{st}$ stream of the user is multiplexed onto tones with indices k %4=0 (e.g., tones 0, 4, 8, . . . , 252), the $2^{nd}$ stream of the user is multiplexed onto tones with indices k %4=1, the $3^{rd}$ stream of the user is multiplexed onto tones with indices k %4=2, and the $4^{th}$ stream of the user is multiplexed onto tones with indices k %4=3. A cyclic rotation of streams across tones is performed for the generation of subsequent HE-LTF symbols in groups of a predetermined number (e.g., in groups of four). For frequency response 413 and corresponding HE-LTF symbol group 423, the $2^{nd}$ stream of the user is multiplexed onto tones with indices k %4=0 (e.g., tones 0, 4, 8, . . . , 252), the $3^{rd}$ stream of the user is multiplexed onto tones with indices k %4=1, the $4^{th}$ stream of the user is multiplexed onto tones with indices k %4=2, and the $1^{st}$ stream of the user is multiplexed onto tones with indices k %4=3. For frequency response 414 and corresponding HE-LTF symbol group 424, the $3^{rd}$ stream of the user is multiplexed onto tones with indices k %4=0 (e.g., tones 0, 4, 8, . . . , 252), the $4^{th}$ stream of the user is multiplexed onto tones with indices k %4=1, the $1^{st}$ stream of the user is multiplexed onto tones with indices k %4=2, and the $2^{nd}$ stream of the user is multiplexed onto tones with indices k %4=3. For frequency response 415 and corresponding HE-LTF symbol group 425, the $4^{th}$ stream of the user is multiplexed onto tones with indices k %4=0 (e.g., tones 0, 4, 8, . . . , 252), the $1^{st}$ stream of the user is multiplexed onto tones with indices k %4=1, the $2^{nd}$ stream of the user is multiplexed onto tones with indices k %4=2, and the $3^{rd}$ stream of the user is multiplexed onto tones with indices k %4=3. By cyclically rotating the streams across tones, the channel coherence across tones is utilized to minimize power fluctuations among the HE-LTF symbols and the HE-STF symbol.

In some embodiments, the access point is performing DL-MU transmission to 4 users, each user allocated 4 spatial streams. For DL-MU transmission, a user receives, after a predetermined number of HE-LTF symbols (e.g., 4 of 16 HE-LTF symbols), an appropriate portion of an LTF mapping matrix for channel estimation of a spatial stream across a subset of tones (e.g., 64 of 256 tones). The HE-LTF symbols are generated at the transmitter by multiplexing the $1^{st}$ stream of all users onto tones with indices k %4=0 (e.g., tones 0, 4, 8, . . . , 252), the $2^{nd}$ stream of all users onto tones with indices k %4=1, the $3^{rd}$ stream of all users onto tones with indices k %4=2, and the $4^{th}$ stream of all users onto tones with indices k %4=3 for the first group of 4 HE-LTF symbols. A cyclic rotation of the streams across tones is applied for the generation of HE-LTF symbols in DL-MU. For the second group of 4 HE-LTF symbols (e.g., HE-LTF5 through HE-LTF8), the $2^{nd}$ stream of all users are multiplexed onto tones with indices k %4=0, the $3^{rd}$ stream of all users onto tones with indices k %4=1, the $4^{th}$ stream of all users onto tones with indices k %4=2, and the $1^{st}$ stream of all users onto tones with indices k %4=3. For HE-LTF9 through HE-LTF12, the $3^{rd}$ stream of all users are multiplexed onto tones with indices k %4=0, the $4^{th}$ stream of all users onto tones with indices k %4=1, the $1^{st}$ stream of all users onto tones with indices k %4=2, and the $2^{nd}$ stream of all users onto tones with indices k %4=3. For HE-LTF9 through HE-LTF12, the $4^{th}$ stream of all users are multiplexed onto tones with indices k %4=0, the $1^{st}$ stream of all users onto tones with indices k %4=1, the $2^{nd}$ stream of all users onto tones with indices k %4=2, and the $3^{rd}$ stream of all users onto tones with indices k %4=3.

In some implementations, $Qmat_k$ is a precoder matrix used by the access point at tone index k. In an example of a DL-MU transmission, $Qmat_k$ is a 16×16 matrix with the structure $$Qmat_k = [q1_k q2_k q3_k \ldots q16_k]$$

where $q1_k$, $q2_k$, . . . , $q16_k$ are 16×1 column vectors, $q1_k$ through $q4_k$ are used for precoding streams 1 through 4 of user 1 at tone index k, $q5_k$ through $q8_k$ are used for precoding streams 5 through 8 of user 2 at tone index k, $q9_k$ through $q12_k$ are used for precoding streams 9 through 12 of user 3 at tone index k, and $q13_k$ through $q16_k$ are used for precoding streams 13 through 16 of user 4 at tone index k. The channel response of the wireless channel from user 1 to the access point at tone index k is represented by $H_{u1,k}$, $H_{u2,k}$, $H_{u3,k}$, and $H_{u4,k}$ matrices each of size 4×16. $Qmat_k$, being the precoder matrix ensures that, in some embodiments, the columns of $Qmat_k$ corresponding to one user are orthogonal to the channel of the other users. As an example, each of $q5_k$ through $q16_k$ (e.g., columns of Qmat corresponding to users 2, 3, and 4) are orthogonal to the rows of $H_{u1,k}$. The access point transmits the 16×1 data vector at tone index k, $X_k$= $[x1_{u1}\ x2_{u1}\ x3_{u1}\ x4_{x1}\ x1_{u2}\ x2_{u2} \ldots x16_{u16}]^T$. X contains data for 4 streams for 4 users and $xp_{uq}$ denotes the data sent on the pth stream to user q. In this example, p and q range from 1 to 4. User 1 receives $Y_{u1,k}=H_{u1,k}*Qmat_k*X_k$ at tone index k.

The access point transmits, in some implementations, a unit vector $X_k$ for the HE-STF portion such that the elements of $X_k$ (e.g., elements $xp_{uq}$) are ¼. User 1 receives $Y_{u1,k,STF}$, where $$Y_{u1,k,STF} = \frac{[H_{u1,k}*Qmat_k*\text{ones}(16,1)]}{4}$$

$$= \frac{[H_{u1,k}*q_{1k}+H_{u1,k}*q_{2k}+H_{u1,k}*q_{3k}+H_{u1,k}*q_{4k}]}{4}$$

$$= \left(\frac{1}{4}\right)*\binom{\text{Sum of contribution of 4 streams}}{\text{of user 1 at tone index } k}$$

and the other columns of $Qmat_k$ are orthogonal. For HE-LTF symbol transmission, the access point transmits a 16×16 P-matrix using the advanced P-matrix design. For example, user 1 receives $Y_{u1,k,LTF1}$ (4×1 vector) during HE-LTF1. Thus, $Y_{u1,k,LTF1}$ is given as $$Y_{u1,k,LTF1} = H_{u1,k}*Qmat_k*P_{16\times16}$$

$$= H_{u1,k}*q_{1k}$$

and represents the contribution of only the $1^{st}$ stream of user 1 at tone index k. Similarly, $Y_{u1,k,LTF2}$, $Y_{u1,k,LTF3}$, and $Y_{u1,k,LTF4}$ represent the contributions of only the $1^{st}$ stream of user 1. $Y_{u1,k,LTF5}$ through $Y_{u1,k,LTF8}$ represent the contributions of only the $2^{nd}$ stream of user 1. $Y_{u1,k,LTF9}$ through $Y_{u1,k,LTF12}$ represent the contributions of only the $3^{rd}$ stream of user 1. $Y_{u1,k,LTF13}$ through $Y_{u1,k,LTF16}$ represent the contributions of only the $4^{th}$ stream of user 1. In some implementations, the powers across streams of a user varies significantly, causing the power of HE-LTF1 through HE-LTF16 to be different from each other and from the power of HE-STF. This power variation is reflective of the power fluctuation within the HE-STF symbol and the HE-LTF symbols.

By transmitting the spatial streams of users across tones using the tone multiplexing of streams described herein, the power fluctuation is minimized during the generation of HE-LTF symbols. In this transmission scheme, the access point transmits $P0_{16\times16}$ at tones k %4=0, $P1_{16\times16}$ at tones k %4=1, $P2_{16\times16}$ at tones k %4=2, and $P3_{16\times16}$ at tones k %4=3. The 16×16 $Pk_{16\times16}$ P-matrices used are generated from the advanced 16×16 P-matrix by shifting its rows down by k in a cyclical order based on the modulo operation to the tone index k. User 1 receives, in some implementations, $Y_{u1,k,LTF1}$, a 4×1 vector, during HE-LTF1. $Y_{u1,k,LTF1}$ is given as $Y_{u1,k,LTF1}=H_{u1,k}*Qmat_k*P0_{16\times16}=H_{u1,k}*q_{1k}$ for k %4=0, $Y_{u1,k,LTF1}=H_{u1,k}*Qmat_k*P1_{16\times16}=H_{u1,k}*q_{2k}$ for k %4=1, $Y_{u1,k,LTF1}=H_{u1,k}*Qmat_k*P2_{16\times16}=H_{u1,k}*q_{3k}$ for k %4=2 and $Y_{u1,k,LTF1}=H_{u1,k}*Qmat_k*P3_{16\times16}=H_{u1,k}*q_{4k}$ for k %4=3. For tones k %4=0, $Y_{u1,k,LTF1}$ represents the contribution of only the $1^{st}$ stream of user 1. For tones k %4=1, $Y_{u1,k,LTF1}$ represents the contribution of only the $2^{nd}$ stream of user 1. For tones k %4=2, $Y_{u1,k,LTF1}$ represents the contribution of only the $3^{rd}$ stream of user 1. For tones k %4=3, $Y_{u1,k,LTF1}$ represents the contribution of only the $4^{th}$ stream of user 1. The sum of power across 4 consecutive sets of tones transmitted in HE-LTF1 is represented by $\Sigma H_{u1,r}*qr_r$. This power is, in some implementations, similar across all HE-LTF symbols and also with respect to the power of the HE-STF symbol when summed across a set of 4 consecutive tones.

Figure 5:
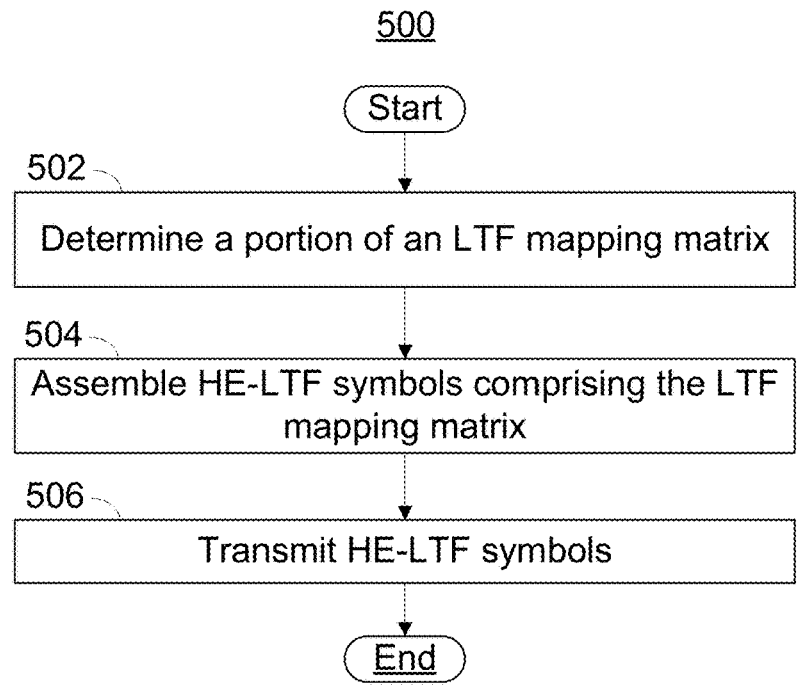
FIG. 5 illustrates a process for transmitting HE-LTF symbols based on the advanced P-matrix design of FIG. 2 in accordance with at least some embodiments of the present disclosure.

FIG. 5 provides an example logic flow diagram illustrating aspects of process 500 for transmitting HE-LTF symbols based on the advanced P-matrix design of FIG. 2, according to some embodiments described herein. Process 500 is, in some embodiments, a process for transmitting HE-LTF symbols in wireless spatial streams over a wireless channel. Process 500 is, in some implementations, performed by control circuitry coupled to a transmitter.

At 502, a portion of an LTF mapping matrix is determined. The portion is less than an entire LTF mapping matrix such that, at the receiver, the portion is received prior to receiving all HE-LTF symbols, in some embodiments. The portion of the LTF mapping matrix is, in some implementations, used for determining a property associated with a spatial stream among the wireless spatial streams transmitted by the transmitter (e.g., channel response for tones associated with a group of HE-LTF symbols received prior to all HE-LTF symbols and mapped by the portion of the LTF matrix). For example, a 16×4 portion of an advanced 16×16 P-matrix is determined, where the P-matrix is used to determine the channel estimates associated with the transmitted spatial streams. The portion of the LTF mapping matrix is, in some embodiments, determined by concatenating a portion of a fixed matrix that is smaller than the LTF mapping matrix and representative of a training matrix known to the transmitter and the receiver with a zero matrix. In some embodiments, the position of the fixed matrix in the portion corresponds to the spatial stream. For example, the 16×4 portion of the advanced 16×16 P-matrix is constructed by a concatenating a 1×4 row of a standard 4×4 P-matrix defined in IEEE 802.11ax with a 3×4 zero matrix, wherein the positioning of the 1×4 row in the $1^{st}$ row corresponds to a $1^{st}$ stream, the $2^{nd}$ row corresponds to a $2^{nd}$ stream, the $3^{rd}$ row corresponds to a $3^{rd}$ stream, etc.

In some embodiments, the LTF mapping matrix is an R-matrix representative of a training matrix for determining carrier phase error accumulated over the transmitted HE-LTF symbols, and HE-LTF symbols mapped using the R-matrix are transmitted over a pilot tone in the wireless channel. For HE-LTF symbols mapped using the R-matrix transmitted over the pilot tone, in some embodiments, the HE-LTF symbols mapped by the R-matrix are assembled such that the R-matrix is representative of the training matrix for determining carrier phase error accumulated over the HE-LTF symbols transmitted over the spatial stream by aligning the portion of the fixed matrix within a subset of rows of the R-matrix for application, at a receiver, of an inverse of the fixed matrix and a pseudo inverse of a channel response matrix to the R-matrix to obtain carrier phase error associated with the spatial stream. The generation and processing of the R-matrix is described in the description of FIG. 2.

At 504, the HE-LTF symbols mapped by the LTF mapping matrix is assembled. Assembly of the HE-LTF symbols includes, in some implementations, constructing the LTF mapping matrix by arranging the portion determined in 504 in an interleaved 16×16 block diagonal matrix as described in the description of FIG. 2 for the advanced 16×16 P-matrix design. The HE-LTF symbols are mapped such that the frequency tones used in the wireless communications system (e.g., data and pilot tones) are mapped using the respective elements of LTF mapping matrices. For example, a wireless communications system using 256 frequency tones is mapped with a 16×16 LTF mapping matrix having 256 respective elements.

At 506, the HE-LTF symbols are transmitted. The transmitted HE-LTF symbols are, in some embodiments, received by a receiver (e.g., receiver 105) and processed according to the process shown in FIG. 7 for receiving HE-LTF symbols transmitted based on the advanced P-matrix design of FIG. 2.

Figure 6:
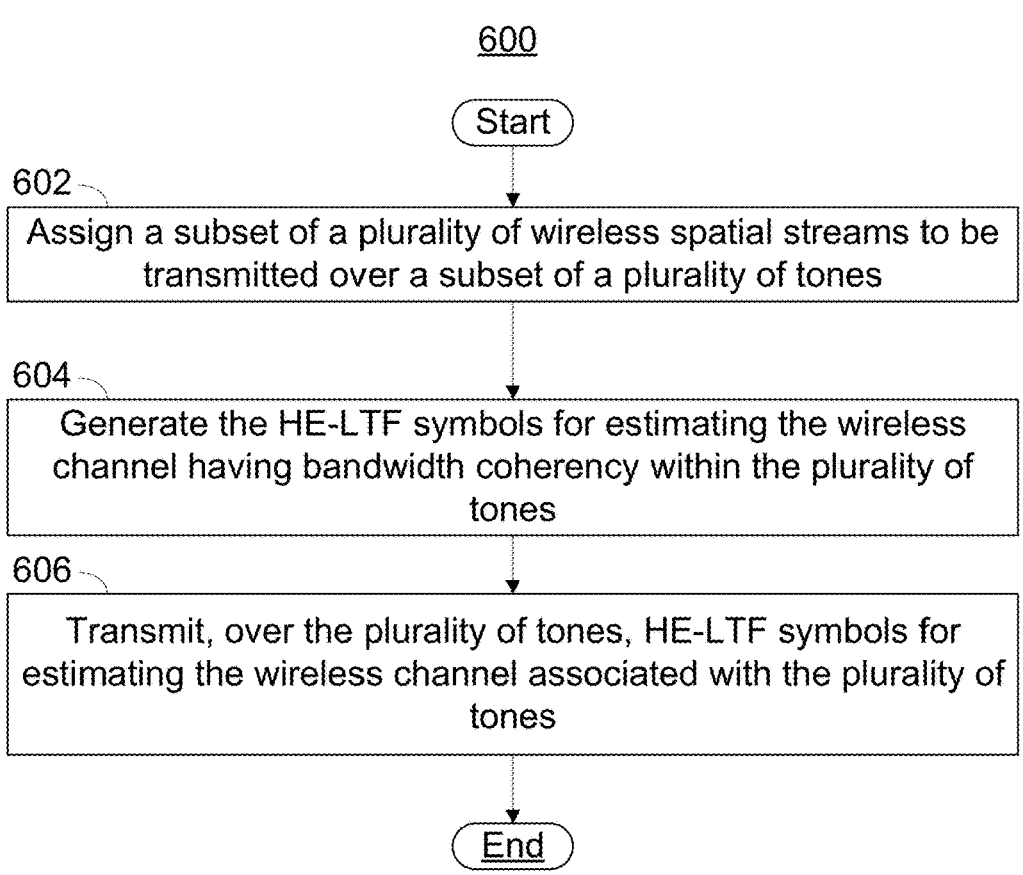
FIG. 6 illustrates a process for transmitting HE-LTF symbols based on the tone multiplexing of FIG. 3 in accordance with at least some embodiments of the present disclosure.

FIG. 6 provides an example logic flow diagram illustrating aspects of process 600 for transmitting HE-LTF symbols based on the tone multiplexing of FIG. 3, according to some embodiments described herein. Process 600 is, in some embodiments, a process for channel estimation based on HE-LTF symbols transmitted to a receiver over a wireless channel by a transmitter over a subset of a plurality of tones. Process 600 is, in some implementations, performed by control circuitry coupled to a transmitter.

At 602, a subset of a plurality of wireless spatial streams is assigned to be transmitted over a subset of a plurality of tones. For example, 3 of 11 wireless spatial streams are assigned to be transmitted over tones 0, 4, 8, . . . , and 252 of 256 tones for a 4×HE-LTF mode and tone-select mode 1 transmission scheme.

At 604, the HE-LTF symbols for estimating the wireless channel having bandwidth coherency within the plurality of tones are generated. For example, the jth HE-LTF symbol transmitted is formed using the corresponding jth column of a modified P-matrix that is modified by using only a subset of rows of a standard P-matrix. The HE-LTF symbol generation for tone multiplexing of spatial streams is further described in the description of FIG. 3. Bandwidth coherency is a property of wireless channels whereby, within a bandwidth of frequency, the magnitude response of the channel response is comparably flat (e.g., the attenuation of a signals transmitted within the bandwidth do not differ greatly from one another). For this reason, reliable interpolation of the portions of a channel bandwidth for which a spatial stream is not transmitted over is more likely achieved.

At 606, the HE-LTF symbols for estimating the wireless channel associated with the plurality of tones is transmitted over the plurality of tones. The transmitted HE-LTF symbols are, in some embodiments, received by a receiver (e.g., receiver 105) and processed according to process 800 shown in FIG. 8 for receiving HE-LTF symbols transmitted based on the tone multiplexing of FIG. 3.

Figure 7:
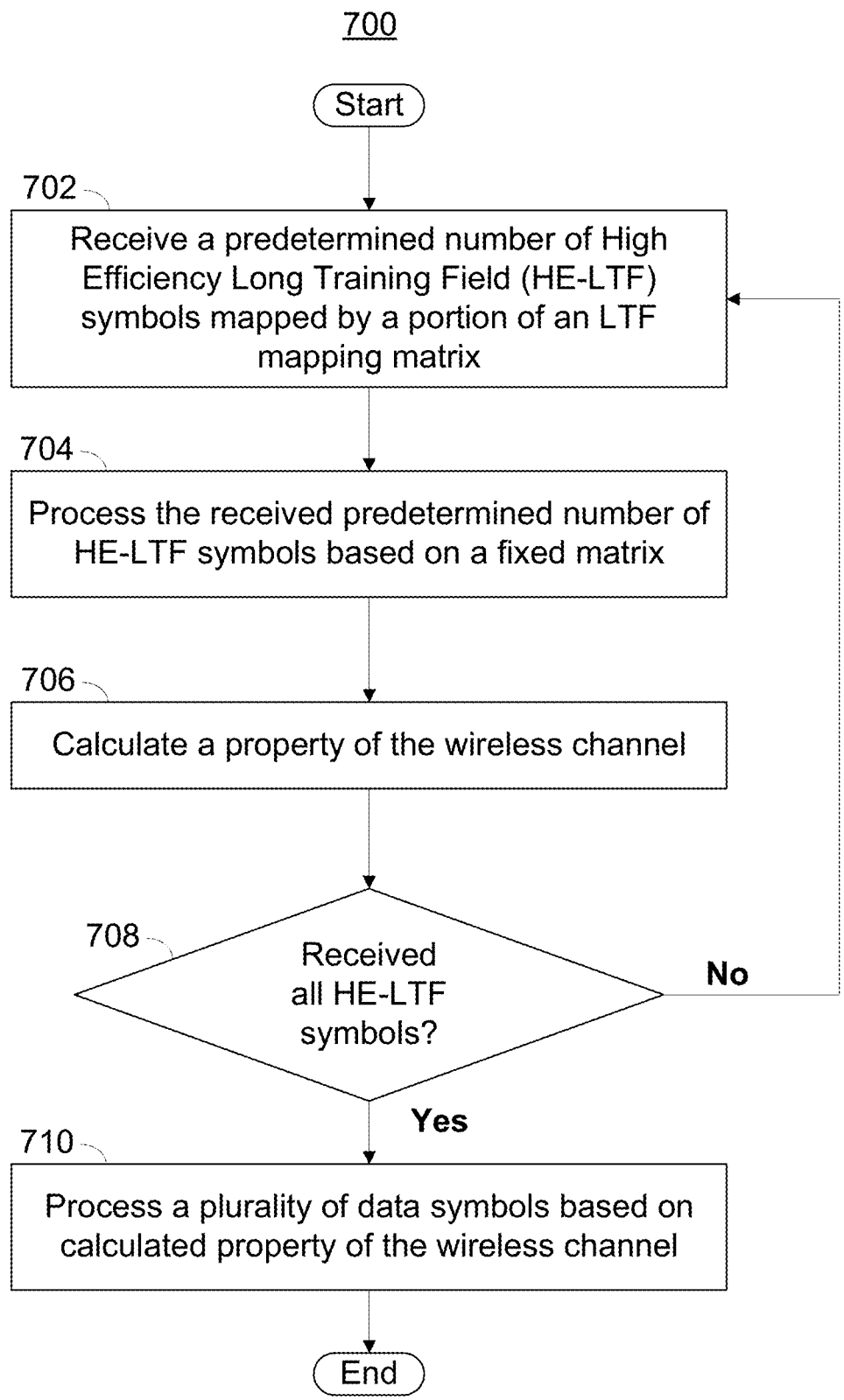
FIG. 7 illustrates a process for receiving HE-LTF symbols transmitted based on the advanced P-matrix design of FIG. 2 in accordance with at least some embodiments of the present disclosure.

FIG. 7 provides an example logic flow diagram illustrating aspects of process 700 for receiving HE-LTF symbols transmitted based on the advanced P-matrix design of FIG. 2, according to some embodiments described herein. Control circuitry coupled to a receiver (e.g., receiver 105), in some embodiments, performs process 700.

At 702, a predetermined number of HE-LTF symbols are received at a user device or station (i.e., STA). The predetermined number of HE-LTF symbols mapped by at least a portion of an LTF mapping matrix. For example, a transmitter generates a 16×16 LTF mapping matrix (e.g., a 16×16 advanced P-matrix) to transmit through 16 HE-LTF symbols, where a 1×4 row of a standard 4×4 P-matrix are arranged in the 16×16 LTF mapping matrix depending on the LTF mapping matrix being either a P-matrix (e.g., an interleaved block diagonal arrangement) or an R-matrix (e.g., a non-interleaved arrangement).

At 704, the received predetermined number of HE-LTF symbols are processed based on a fixed matrix. The processing, in some embodiments, includes an undo P operation. For example, a Hermitian of a 4×4 standard P-matrix is applied to a 16×4 portion of the 16×16 advanced P-matrix transmitted over 4 HE-LTF symbols. The 16×4 portion further includes a concatenation of the 1×4 portions with 1×4 zero matrices, as described in the description of FIGS. 2-3 for the advanced P-matrix and R-matrix designs.

At 706, a property of the wireless channel is calculated. Properties of the wireless channel include channel estimates and carrier phase errors. After applying an undo P to a 16×4 portion of the 16×16 advanced P-matrix transmitted over 4 HE-LTF symbols, the resulting calculation is a channel estimate for, in some embodiments, 4 of 16 wireless spatial streams (e.g., $1^{st}$, $5^{th}$, $9^{th}$, and $13^{th}$ streams corresponding to the rows on which a 1×4 row of a standard 4×4 P-matrix are arranged in the advanced 16×16 P-matrix). For example, an undo P operation may be applied, in 704, to a portion of an R-matrix received, in 702, over a pilot tone to calculate CPE that has accumulated over HE-LTF1 through HE-LTF8 (e.g., calculated after receiving the 8$^{th}$ HE-LTF symbol of 16 symbols).

At 708, control circuitry determines whether all the HE-LTF symbols have been received. For example, if the receiver has received the data payload (e.g., the data block as shown in FIG. 3 that is transmitted after the HE-LTF symbols in the preamble), the control circuitry determines all HE-LTF symbols have been received and proceeds to 710 to process the data. Otherwise, the process returns to 702 to receive a predetermined number of HE-LTF symbols mapped by the portion of the LTF mapping matrix (e.g., the next 4 HE-LTF symbols mapped by 1×4 portions of the standard 4×4 P-matrix concatenated with 1×4 zero matrices).

At 710, data symbols are processed based at least on the property of the wireless channel calculated in 706. For example, processing circuitry at the receiver uses the channel response matrices H determined in 706 to apply a pseudo-inverse of H to the received data payload to obtain a representation of information signal x (e.g., received y=Hx and processed H$^H$*y=x). A pseudo-inverse of a channel response matrix H refers to a matrix H such that the matrix operation H*H$^H$=I, where H$^H$ is the pseudo-inverse and I is the identity matrix.

Figure 8:
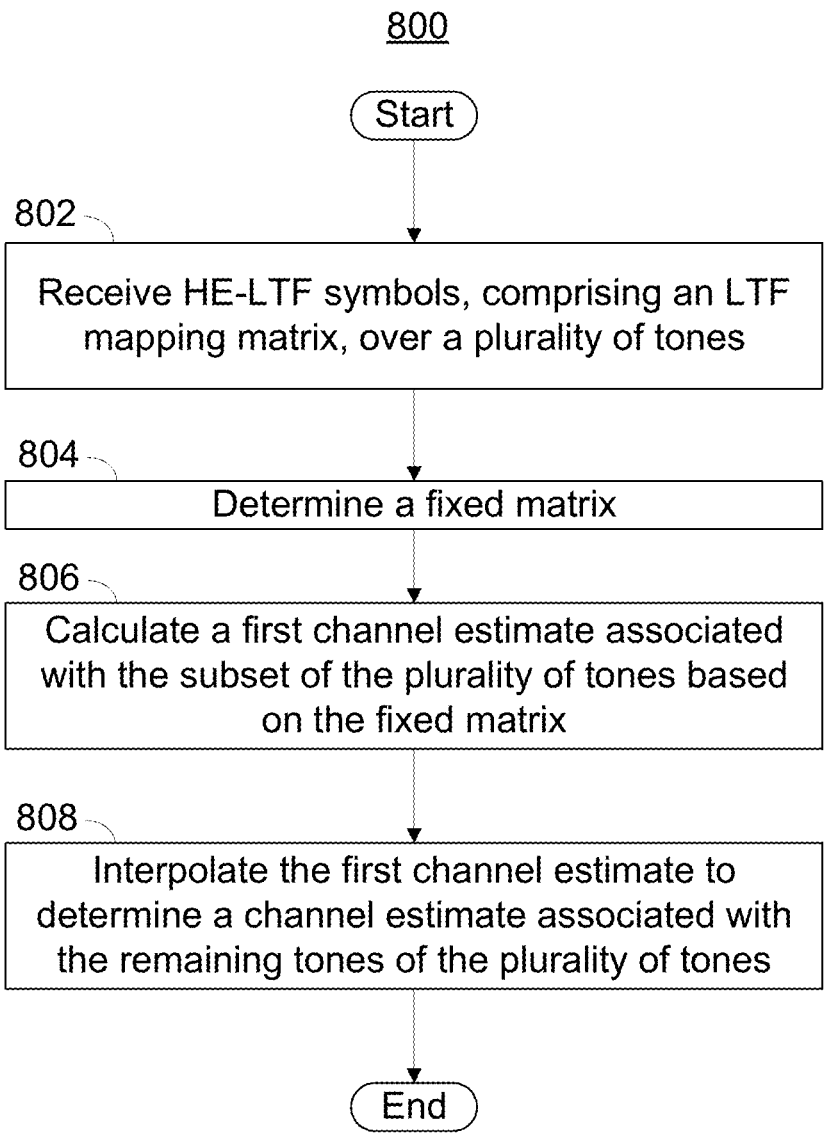
FIG. 8 illustrates a process for receiving HE-LTF symbols transmitted based on the tone multiplexing of FIG. 3 in accordance with at least some embodiments of the present disclosure.

FIG. 8 provides an example logic flow diagram illustrating aspects of process 800 for receiving HE-LTF symbols transmitted based on the tone multiplexing of FIG. 3, according to some embodiments described herein. Control circuitry coupled to a receiver (e.g., receiver 105), in some embodiments, performs process 800.

At 802, HE-LTF symbols mapped by an LTF mapping matrix over tones are received. For example, in a transmission using 4×HE-LTF mode, each HE-LTF symbols is received over 256 tones. An LTF mapping matrix such as an advanced P-matrix or R-matrix are transmitted over the HE-LTF symbols. Each HE-LTF symbol, in some implementations, is loaded based on a portion of the LTF mapping matrix. The generation of HE-LTF symbols for tone multiplexing is described in the description of FIG. 3.

At 804, a fixed matrix to be used for the construction of the larger LTF mapping matrix is determined. The fixed matrix is, in some embodiments, a standard P-matrix as defined for IEEE 802.11ax. For example, the fixed matrix could be a standard 2×2, 4×4, 6×6, or 8×8 P-matrix. As described in the description of FIG. 2, a fixed matrix used in the construction of the 16×16 advanced P-matrix is a row of a standard 4×4 P-matrix (e.g., P$_{4×4}$$^1$). The fixed matrix is determined based on the maximum number of spatial streams over all sets of spatial streams. For example, in the spatial stream assignment of {3, 3, 3, 2}, a standard 4×4 P-matrix is determined to be the fixed matrix because 4 is the smallest dimension of the standard P-matrices that is larger than the largest number of spatial streams assigned to any set, 3.

At 806, a first channel estimate associated with the subset of the plurality of tones is calculated based on the fixed matrix. A Hermitian of the fixed matrix is, in some implementations, used in an undo P operation applied to the received LTF-mapping matrix. For example, a Hermitian of a standard 4×4 P-matrix is applied to the received signal during a HE-LTF symbol such that the resulting calculation is a representation of the channel response that is spatially mapped by a Q-matrix according to the number of spatial streams transmitted over a set of tones and the number of antennas at a transmitter. In the description of FIG. 3, an example of H$_{N_r×N_t}$Q(1)$_{N_t×3}$ is given that is representative of the channel response of the spatial streams transmitted over tones {0, 4, 8, . . . , 252}.

At 808, the first channel estimate is interpolated to determine a channel estimate associated with the remaining tones that the spatial stream was not transmitted over. For example, H$_{N_r×N_t}$Q(1)$_{N_t×3}$ is interpolated to determine the channel response of the spatial streams transmitted over tones {1, 2, 3, 5, 6, 7, . . . , 253, 254, and 255}.

Figure 9:
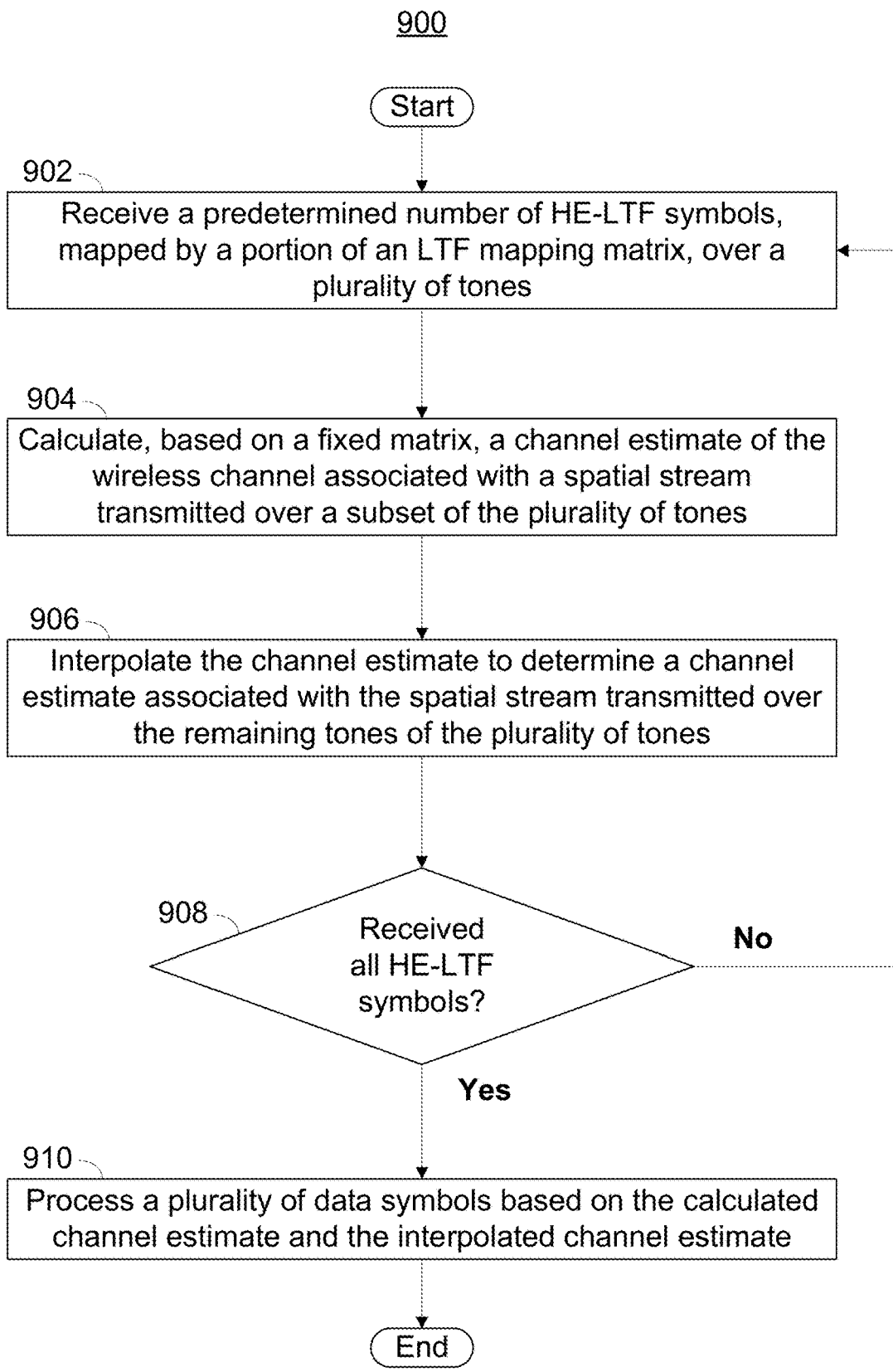
FIG. 9 illustrates a process for receiving HE-LTF symbols transmitted based on a combination of the advanced P-matrix design of FIG. 2 and the tone multiplexing of FIG. 3 in accordance with at least some embodiments of the present disclosure.

FIG. 9 provides an example logic flow diagram illustrating aspects of process 900 for receiving HE-LTF symbols transmitted based on a combination of the advanced P-matrix design of FIG. 2 and the tone multiplexing of FIG. 3, according to some embodiments described herein. Control circuitry coupled to a receiver (e.g., receiver 105), in some embodiments, performs process 900.

At 902, a predetermined number of HE-LTF symbols are received over tones. The predetermined number of HE-LTF symbols are mapped by a portion of an LTF mapping matrix. For example, the first 4 of 16 HE-LTF symbols transmitted over all 256 tones is received. The 4 HE-LTF symbols are generated at a transmitter using, in some implementations, a 1×4 portion of a standard 4×4 P-matrix. When received, the 4 HE-LTF symbols are represented through a mapping by the 1×4 portion of the standard 4×4 P-matrix. The 1×4 portion is, in some embodiments, used in a calculation whose value is subsequently loaded onto an HE-LTF symbol (e.g., in the formation of HE-LTF symbols in tone multiplexing).

At 904, a channel estimate of the wireless channel associated with a spatial stream transmitted over the subset of the tones is calculated based on a fixed matrix. A fixed matrix is, in some embodiments, a standard P-matrix as defined by 802.11ax. For example, the undo P operation using a Hermitian of the standard P-matrix results in the channel estimate for a stream transmitted over a subset of the tones (e.g., the channel estimate for a first stream over tones 0, 4, 8, . . . , and 252).

At 906, the channel estimate is interpolated to determine a channel estimate associated with the spatial stream transmitted over the remaining tones. For example, the channel estimate calculated in 904 is interpolated to determine the channel estimate for the stream transmitted over tones 1, 2, 3, 5, 6, 7, . . . , 253, 254, and 255.

At 908, control circuitry determines whether all the HE-LTF symbols are received. For example, if the receiver has received the data payload (e.g., the data block as shown in FIG. 3 that is transmitted after the HE-LTF symbols in the preamble), the control circuitry determines all HE-LTF symbols have been received and proceeds to 910 to process the data.

Otherwise, the process returns to 902 to receive a predetermined number of HE-LTF symbols mapped by the portion of the LTF mapping matrix (e.g., the next 4 HE-LTF symbols mapped by 1×4 portions of the standard 4×4 P-matrix concatenated with 1×4 zero matrices).

At 910, data symbols are processed based at least on the calculated channel estimate and the interpolated channel estimate of 904 and 906, respectively. For example, processing circuitry at the receiver uses the channel response matrix H, where H is mapped to the spatial stream that is transmitted over the subset of the tones, determined from the calculation in 904 combined with the interpolated estimate from 906. Processing circuitry then applies a pseudo-inverse of H to the received data payload to obtain a representation of the information signal that accounts for the effects of the wireless channel.

Various embodiments discussed in conjunction with FIGS. 1-9 are performed by various electronic components of one or more electronic circuits, such as but not limited to an integrated circuit, application-specific integrated circuit (ASIC), DSP, and/or the like. While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A system for transmitting High Efficiency Long Training Field (HE-LTF) symbols to a receiver over a wireless channel, the system comprising:
   a transmitter configured to transmit a total number of HE-LTF symbols corresponding to an LTF mapping matrix for determining a plurality of wireless channel properties of the wireless channel over which the HE-LTF symbols are transmitted by the transmitter; and
   control circuitry coupled to the transmitter, the control circuitry configured to:
      determine a portion of the LTF mapping matrix for calculating, at a receiver, a wireless channel property of the plurality of wireless channel properties based on a subset of the HE-LTF symbols mapped by the portion, wherein the subset of the HE-LTF symbols mapped by the portion is less than the total number of HE-LTF symbols to be transmitted; and
      assemble, based at least on the determined portion of the LTF mapping matrix, the subset of the HE-LTF symbols mapped by the portion of the LTF mapping matrix.

2. The system for transmitting HE-LTF symbols of claim 1, wherein the control circuitry is configured to determine the portion of the LTF mapping matrix by concatenating a portion of a fixed matrix with a zero matrix, wherein a position of the portion of the fixed matrix in the portion of the LTF mapping matrix corresponds to the spatial stream and wherein the fixed matrix associated with a standard LTF mapping matrix.

3. The system for transmitting HE-LTF symbols of claim 2, wherein the LTF mapping matrix is an R-matrix representative of a training matrix for determining carrier phase error accumulated over the transmitted HE-LTF symbols, and wherein the transmitter is further configured to transmit HE-LTF symbols mapped by the R-matrix over one or more pilot tones in the wireless channel.

4. The system for transmitting HE-LTF symbols of claim 3, wherein, for HE-LTF symbols mapped by the R-matrix transmitted over the pilot tone, the control circuitry being configured to assemble the HE-LTF symbols mapped by the R-matrix by aligning the portion of the fixed matrix within a subset of rows of the R-matrix for application, at the receiver, of an inverse of the fixed matrix and a pseudo inverse of a channel response matrix to the R-matrix to obtain carrier phase error associated with the spatial stream.

5. The system for transmitting HE-LTF symbols of claim 2, wherein the LTF mapping matrix is a P-matrix representative of a training matrix for determining at least a channel estimate of the spatial stream, wherein the transmitter is further configured to transmit HE-LTF symbols mapped by the P-matrix over one or more data tones in the wireless channel.

6. The system for transmitting HE-LTF symbols of claim 5, wherein, for HE-LTF symbols mapped by the P-matrix transmitted over the data tone, the control circuitry is configured to assemble the HE-LTF symbols mapped by the P-matrix by interleaving the portion of the fixed matrix diagonally for application, at the receiver, of an inverse of the fixed matrix at the position of the portion of the fixed matrix in the P-matrix to determine the channel estimate of the spatial stream after receiving a subset of the transmitted HE-LTF symbols.

7. The system for transmitting HE-LTF symbols of claim 1, wherein the HE-LTF symbols are transmitted over a plurality of wireless spatial streams and wherein the control circuitry is further configured to assign a subset of the wireless spatial streams to a set of tones in the wireless channel.

8. The system for transmitting HE-LTF symbols of claim 7, wherein the control circuitry is further configured to cyclically shift the rows of the LTF mapping matrix a predetermined number of times such that each tone of the set of tones is associated with a cyclically shifted LTF mapping matrix by shifting the rows of a predetermined LTF mapping matrix cyclically by a number corresponding to a modulo of a tone number over which the shifted LTF mapping matrix is transmitted.

9. A method for transmitting High Efficiency Long Training Field (HE-LTF) symbols to a receiver over a wireless channel, the method comprising:
   determining a portion of an LTF mapping matrix for calculating, at a receiver, a wireless channel property of the plurality of wireless channel properties based on a subset of a total number of the HE-LTF symbols mapped by the portion, wherein the subset of the HE-LTF symbols mapped by the portion is less than the total number of HE-LTF symbols to be transmitted;
   assembling, based at least on the determined portion of the LTF mapping matrix, the subset of the HE-LTF symbols mapped by the portion of the LTF mapping matrix; and
   transmitting the subset of HE-LTF symbols corresponding to the LTF mapping matrix for determining a plurality of wireless channel properties of the wireless channel over which the HE-LTF symbols are transmitted by a transmitter.

10. A system for channel estimation based on High Efficiency Long Training Field (HE-LTF) symbols transmitted to a receiver over a wireless channel by a transmitter over a plurality of tones, the system comprising:
   control circuitry coupled to the transmitter, the control circuitry configured to:
      assign, based on a modulo operation applied to tone indices corresponding to the plurality of tones, a plurality of wireless spatial streams to the plurality of tones, wherein a subset of the plurality of tones is separated by one or more tones unassigned to the subset of the plurality of tones; and
      generate, based on the assigned plurality of wireless spatial streams, the HE-LTF symbols for estimating, at the receiver, the wireless channel having bandwidth coherency within the plurality of tones; and
   the transmitter configured to transmit, over the plurality of tones, the generated HE-LTF symbols for interpolation of a channel estimate matrix corresponding to the one or more tones unassigned to the subset of the unassigned tones.

11. The system for channel estimation of claim 10, the control circuitry further configured to select an HE mode associated with a maximum number of tones available for transmission of the HE-LTF symbols, wherein the number of the plurality of tones is the maximum number of tones.

12. The system for channel estimation of claim 11, wherein the control circuitry is configured to select the HE mode by selecting a 4xHE-LTF mode having the maximum number of tones available for transmission of the HE-LTF symbols.

13. The system for channel estimation of claim 11, wherein the control circuitry is configured to select the HE mode by selecting a 2xHE-LTF mode having half of the maximum number of tones available for transmission of the HE-LTF symbols.

14. The system for channel estimation of claim 11, the control circuitry further configured to:
select a first tone-select mode; and
in response to selecting the first tone-select mode, divide the maximum number of tones into four subsets of tones available for transmission of the HE-LTF symbols.

15. The system for channel estimation of claim 14, wherein the control circuitry is further configured to:
determine, based on the tone-select mode, a minimum number of the number of wireless spatial streams assignable to each subset of the four subsets of the plurality of tones; and
distribute a remaining number i of wireless spatial streams, calculated based on the minimum number, evenly among i subsets of the four subsets.

16. The system for channel estimation of claim 10, the control circuitry further configured to select a tone-select mode indicative of a maximum number of subsets of wireless spatial streams transmittable over the plurality of tones.

17. The system for channel estimation of claim 10, wherein the control circuitry is configured to generate a P-matrix having a first amount of rows of a pre-defined matrix, wherein the first amount corresponds to the number of the subset of wireless spatial streams to be transmitted over the subset of the plurality of tones.

18. The system for channel estimation of claim 10, wherein the transmitter is further configured to transmit a spatial mapping matrix associated with a mapping of a channel response matrix to the plurality of wireless spatial streams over the plurality of tones, the spatial mapping matrix having a number of rows associated with a number of antennas at the transmitter and a number of columns associated with a number of the plurality of wireless spatial streams.

19. The system for channel estimation of claim 18, wherein the control circuitry is further configured to generate the spatial mapping matrix based on a portion of the spatial mapping matrix, wherein the portion has the number of rows associated with the number of antennas at the transmitter and a number of columns corresponding to the number of the subset of wireless spatial streams to be transmitted over the subset of the plurality of tones.

20. The system for channel estimation of claim 10, wherein the control circuitry is further configured to, for a plurality of users, transmit HE-LTF symbols associated with a first user of the plurality of users on a first tone and transmit HE-LTF symbols associated with a second user of the plurality of users on a second tone.

* * * * *